United States Patent
Kobayashi et al.

(10) Patent No.: US 7,142,492 B2
(45) Date of Patent: Nov. 28, 2006

(54) OPTICAL RECORDING MEDIUM

(75) Inventors: Tatsuhiro Kobayashi, Tokyo (JP); Tatsuya Kato, Tokyo (JP); Hiroyasu Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/519,693

(22) PCT Filed: Jun. 27, 2003

(86) PCT No.: PCT/JP03/08204

§ 371 (c)(1),
(2), (4) Date: Aug. 18, 2005

(87) PCT Pub. No.: WO2004/015695

PCT Pub. Date: Feb. 19, 2004

(65) Prior Publication Data

US 2006/0013089 A1    Jan. 19, 2006

(30) Foreign Application Priority Data

Jun. 27, 2002   (JP) .............................. 2002-187617

(51) Int. Cl.
*G11B 7/00* (2006.01)
(52) U.S. Cl. ................... 369/47.53; 369/47.5; 369/53.1
(58) Field of Classification Search ............. 369/47.53, 369/47.5, 53.1
See application file for complete search history.

(56) References Cited

U.S. PATENT DOCUMENTS 5,828,636 A * 10/1998 Matsumoto et al. ..... 369/44.27
6,765,850 B1 * 7/2004 Shiozawa et al. ........ 369/47.52
6,898,163 B1  5/2005 Takeda ..................... 369/47.53
2002/0176338 A1  11/2002 Ushiyama et al. ....... 369/47.53
2003/0147321 A1 *  8/2003 Okubo et al. ............ 369/47.53

FOREIGN PATENT DOCUMENTS

| JP | 6-89436 | 3/1994 |
| JP | 8-50722 | 2/1996 |
| JP | 10-69639 | 3/1998 |
| JP | 11-16251 | 1/1999 |
| JP | 2001-209941 | 8/2001 |

* cited by examiner

*Primary Examiner*—Wayne Young
*Assistant Examiner*—Van Pham
(74) *Attorney, Agent, or Firm*—Seed IP Law Group PLLC

(57) ABSTRACT

A method for determining the recording power of a laser beam so that jitter from a reproduced signal obtained by reproducing data recorded in a data rewritable type optical recording medium can be controlled within an acceptable tolerance even when cross erasing of data occurs. The power of a laser beam is measured for each level of the recording power of the laser beam. Critical parameters are calculated for each level of the recording power of the laser beam. The critical parameters are projected onto a data rewritable type optical recording medium for recording data therein. Direct overwriting required for saturating an influence of cross erasing of data is performed x times in one embodiment to determine a critical parameter. A data recording apparatus storing a critical parameter used for determining the power of a laser beam is associated with ID data for identifying the kind of optical recording medium. A data recording apparatus storing an optimum recording power used for determining the power of a laser beam is also associated with ID data for identifying the kind of optical recording medium.

6 Claims, 9 Drawing Sheets

|  | R1 | R2 | R3 |
|---|---|---|---|
| Pw = Pw(min) | ****** | ****** | ****** |
| Pw = Pw(min)+α | ****** | ****** | ****** |
| ⋮ | ⋮ | ⋮ | ⋮ |
| Pw = Pw(max) | ****** | ****** | ****** |

T

OPTICAL RECORDING MEDIUM

BACKGROUND OF THE INVENTION

The present invention relates to a method for determining the power of a laser beam, a method for determining a critical parameter used for determining the power of a laser beam, an optical recording medium and a data recording apparatus and, particularly, to a method for determining the power of a laser beam which can determine the recording power of the laser beam so that jitter of a reproduced signal obtained by reproducing data recorded in a data rewritable type optical recording medium can be controlled within a tolerance even when cross erasing of data occurs and that the reproduced signal having the highest level can be obtained, a method for determining a critical parameter used for determining the power of a laser beam which can determine the recording power of the laser beam to be projected onto a data rewritable type optical recording medium so that jitter of a reproduced signal obtained by reproducing data recorded in the data rewritable type optical recording medium can be controlled within a tolerance even when cross erasing of data occurs and that the reproduced signal having the highest level can be obtained, a data rewritable type optical recording medium in which a critical parameter used for determining the power of a laser beam which can determine the recording power of the laser beam so that jitter of a reproduced signal obtained by reproducing data recorded therein can be controlled within a tolerance even when cross erasing of data occurs and that the reproduced signal having the highest level can be obtained, a data recording apparatus storing a critical parameter used for determining the power of a laser beam which can determine the recording power of the laser beam to be projected onto a data rewritable type optical recording medium so that jitter of a reproduced signal obtained by reproducing data recorded in the data rewritable type optical recording medium can be controlled within a tolerance even when cross erasing of data occurs and that the reproduced signal having the highest level can be obtained, and a data recording apparatus storing an optimum recording power of a laser beam to be projected onto a data rewritable optical recording medium so that jitter of a reproduced signal obtained by reproducing data recorded in the data rewritable type optical recording medium can be controlled within a tolerance even when cross erasing of data occurs and that the reproduced signal having the highest level can be obtained.

DESCRIPTION OF THE PRIOR ART

Optical recording discs such as the CD, DVD and the like have been widely used as recording media for recording digital data.

As a method for recording data in an optical recording medium, there has been widely used a method for modulating data to be recorded into lengths of a recording mark and a blank region. For example, in a DVD-RW which is an optical recording medium in which data can be rewritten by the user, recording marks and blank regions having lengths corresponding to a 3T signal to an 11T signal and a 14T signal are used for recording data therein.

In the case where data are to be recorded in a recording layer containing a phase change material of a data rewritable optical recording medium, a laser beam whose power is modulated is projected onto the recording layer along a track formed on the optical recording medium, thereby forming an amorphous region in the recording layer so that the thus formed amorphous region of the recording layer is used as a recording mark and a crystalline region of the recording layer is used as a blank region.

In the case where a recording mark is to be formed at a predetermined region of the recording layer, the power of a laser beam is modulated to a sufficiently high recording power Pw, the laser beam is projected onto the predetermined region of the recording layer, thereby heating the predetermined layer of the recording layer to a temperature equal to or higher than the melting point of a phase change material and the power of the laser beam is then modulated to a bottom power Pb lower than the recording power Pw, thereby quickly cooling the predetermined layer of the recording layer and changing the phase thereof from a crystalline phase to an amorphous phase.

To the contrary, in the case where a recording mark formed in the recording layer is to be erased, the power of the laser beam is modulated to an erasing power Pe higher than the bottom power Pb and lower than the recording power Pw, the laser beam is projected onto a region of the recording layer where the recording mark is formed, thereby heating the region of the recording layer to a temperature equal to or higher than the crystallized temperature of the phase change material and the region of the recording layer is then gradually cooled, thereby crystallizing the phase change material in an amorphous phase.

In this manner, it is possible to form a recording mark in the recording layer and erase the recording mark formed in the recording mark by modulating the power of a laser beam to be projected onto the recording layer between the recording power Pw, the erasing power Pe and the bottom power Pb different from each other, thereby directly overwriting a recording mark formed in the recording layer with a different recording mark.

However, in a data rewritable type optical recording medium, when data are to be written in the recording layer on a particular track of a recording layer, the reduction in carrier levels of data written on opposite tracks of the track, namely, so-called cross erasing of data sometimes occurs.

Particularly, in a next-generation type optical recording medium that offers increased recording density and has an extremely high data transfer rate, cross erasing of data tends to occur in comparison with a conventional optical recording medium.

More specifically, in a next-generation type optical recording medium, since in order to achieve high data transfer rate, it is required to record data at a higher linear recording velocity that that for recording data in a conventional optical recording medium and it is required to set a recording power of a laser beam to a higher level as the linear recording velocity is higher, when data are to be written on a particular track of a recording layer, tracks on the opposite sides of the track are liable to be subjected to thermal influence from the track on which data are to be written and cross erasing of data tends to occur.

Further, in a next-generation type optical recording medium, since a ratio TP/D of a track pitch TP to a spot diameter of the laser beam is small, when data are to be written on a particular track of a recording layer, cross erasing of data tends to occur.

SUMMARY OF THE INVENTION

It is therefore an object of the present invention to provide a method for determining the power of a laser beam which can determine the recording power of the laser beam so that jitter of a reproduced signal obtained by reproducing data recorded in a data rewritable type optical recording medium can be controlled within a tolerance even when cross erasing of data occurs and that the reproduced signal having the highest level can be obtained.

It is another object of the present invention to provide a method for determining a critical parameter used for determining the power of a laser beam which can determine the recording power of the laser beam to be projected onto a data rewritable type optical recording medium so that jitter of a reproduced signal obtained by reproducing data recorded in the data rewritable type optical recording medium can be controlled within a tolerance even when cross erasing of data occurs and that the reproduced signal having the highest level can be obtained.

It is a further object of the present invention to provide a data rewritable type optical recording medium in which a critical parameter used for determining the power of a laser beam which can determine the recording power of the laser beam so that jitter of a reproduced signal obtained by reproducing data recorded therein can be controlled within a tolerance even when cross erasing of data occurs and that the reproduced signal having the highest level can be obtained.

It is a still further object of the present invention to provide a data recording apparatus storing a critical parameter used for determining the power of a laser beam which can determine the recording power of the laser beam to be projected onto a data rewritable type optical recording medium so that jitter of a reproduced signal obtained by reproducing data recorded in the data rewritable type optical recording medium can be controlled within a tolerance even when cross erasing of data occurs and that the reproduced signal having the highest level can be obtained.

It is a yet further object of the present invention to provide a data recording apparatus storing an optimum recording power of a laser beam to be projected onto a data rewritable optical recording medium so that jitter of a reproduced signal obtained by reproducing data recorded in the data rewritable type optical recording medium can be controlled within a tolerance even when cross erasing of data occurs and that the reproduced signal having the highest level can be obtained.

The above objects of the present invention can be accomplished by a method for determining a power of a laser beam which is adapted for determining a recording power of the laser beam to be projected onto a data rewritable type optical recording medium for recording data therein, the method for determining a power of a laser beam comprising steps of projecting the laser beam onto a first track, a second track and a third is track in this order formed on the data rewritable type optical recording medium to be adjacent with each other while varying a level of the recording power of the laser beam, thereby recording a first test signal, reproducing the first test signal recorded on the second track, measuring, for each of the levels of the recording power of the laser beam, jitter JJ1 of the thus reproduced signal, reproducing the first test signal recorded on the third track, measuring jitter JJ0 of the thus reproduced signal, projecting the laser beam onto the first track and the third track y times where y is a positive integer, thereby directly overwriting the first test signal recorded on the first track and the first test signal recorded on the third track with the first test signal, reproducing the first test signal recorded on the second track, measuring jitter JJ(n+1) of the thus reproduced signal where n is an integer equal to or larger than 0 and equal to or smaller than y, obtaining, for each of the levels of the recording power of the laser beam, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal, setting the recording power of the laser beam to a predetermined level, projecting the laser beam onto a fourth track, a fifth track and a sixth track in this order formed on the data rewritable type optical recording medium to be adjacent with each other, thereby recording a second test signal thereon, reproducing the second test signal recorded on the fifth track, measuring an amplitude A1 and jitter J1 of the thus reproduced signal, reproducing the second test signal recorded on the sixth track, measuring an amplitude A0 of the thus reproduced signal, calculating, for each of the levels of the recording power of the laser beam, a first parameter as a function of a difference between the amplitude A0 of the reproduced signal obtained from the sixth track and the amplitude A1 of the reproduced signal obtained from the fifth track, directly overwriting the second test signal recorded on the fourth track and the second test signal recorded on the sixth track with the second test signal x times, reproducing the second test signal recorded on the fifth track, measuring an amplitude A(x+1) and jitter J(x+1) of the thus reproduced signal, calculating, for each of the levels of the recording power of the laser beam, a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal, obtaining a value of the first parameter corresponding to a value of the second parameter when the third parameter is equal to a tolerance, thereby determining a critical parameter, recording a third test signal in the data rewritable type optical recording medium while varying levels of the recording power of the laser beam, measuring, when signal characteristics of a reproduced signal obtained by reproducing the third signal recorded in the data rewritable type optical recording medium satisfy reference conditions, an amplitude D3 of a reproduced signal obtained by reproducing the third test signal before the third test signal is influenced by cross erasing of data and an amplitude D2 of a reproduced signal obtained by reproducing the third test signal after the third test signal was once influenced by cross erasing of data for each of the levels of the recording power of the laser beam, calculating, based on the amplitude D2 of the reproduced signal and the amplitude D3 of the reproduced signal obtained by reproducing the third test signals, a fourth parameter as a function of a difference between the amplitude D3 of the reproduced signal obtained by reproducing the third test signal before the third test signal is influenced by cross erasing of data and the amplitude D2 of he reproduced signal obtained by reproducing the third test signal after the third test signal was once influenced by cross erasing of data, comparing the critical parameter and the fourth parameter, and determining the recording power of the laser beam at which the fourth parameter was obtained as an optical recording power when the fourth parameter is equal to or smaller than the critical parameter.

According to the present invention, it is possible to determine an optimum recording power of the laser beam so that jitter of a reproduced signal obtained by reproducing data recorded in a data rewritable type optical recording medium can be controlled within a tolerance even when cross erasing of data occurs and that that the reproduced signal having the highest level can be obtained only by measuring, when the signal characteristics of the reproduced signal obtained by recording the third test signal in the data rewritable type optical recording medium while varying levels of the recording power of the laser beam and reproducing the third test signal recorded in the data rewritable type optical recording medium satisfy the reference conditions, an amplitude D3 of the reproduced signal obtained by reproducing the third test signal before the third test signal is influenced by cross erasing of data and an amplitude D2 of the reproduced signal obtained by reproducing the third test signal after the first test signal was once influenced by cross erasing of data for each of the levels of the recording power of the laser beam, calculating a fourth parameter based on the amplitudes D3 and D2 of the reproduced signals obtained by reproducing the test signal as a function of the difference between the amplitude D3 of the reproduced signal obtained by reproducing the third test signal before the third test signal is influenced by cross erasing of data and the amplitude D2 of the reproduced signal obtained by reproducing the third test signal after the first test signal was once influenced by cross erasing of data, and comparing the thus calculated fourth parameter with a critical parameter determined in advance.

Further, according to the present invention, since the critical parameter is calculated by projecting the laser beam onto a first track, a second track and a third track in this order formed on the data rewritable type optical recording medium to be adjacent with each other, thereby recording a first test signal, reproducing the first test signal recorded on the second track, measuring, for each of the levels of the recording power of the laser beam, jitter JJ1 of the thus reproduced signal, reproducing the first test signal recorded on the third track, measuring jitter JJ0 of the thus reproduced signal, projecting the laser beam onto the first track and the third track y times where y is a positive integer, thereby directly overwriting the first test signal recorded on the first track and the first test signal recorded on the third track with the first signal, reproducing the first test signal recorded on the second track, measuring jitter JJ(n+1) of the thus reproduced signal where n is an integer equal to or larger than 0 and equal to or smaller than y, obtaining, for each of the levels of the recording power of the laser beam, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal, and determining the critical parameter based on the thus experimentally determined the number of times x of the direct overwriting required for saturating an influence of cross erasing of data on the first test signal recorded on the second track by directly overwriting the first test signal recorded on the first track and the first test signal recorded on the third track with the first test signal, even in the case where the first test signal has been repeatedly influenced by cross erasing of data until the influence of cross erasing of data on the first test signal recorded on the second track has been saturated, it is possible to accurately determine the critical parameter so as to correspond to the critical third parameter at which increase in jitter can be permitted and it is therefore possible to determine an optimum power of the recording power of the laser beam so that the increase in jitter of a reproduced signal can be controlled within a tolerance by judging whether or not the fourth parameter is equal to or smaller than the critical parameter.

In a preferred aspect of the present invention, the method for determining a power of a laser beam comprises steps of setting the recording power of the laser beam to a predetermined level, sequentially projecting the laser beam onto a seventh track, an eighth track, and a ninth track formed on the data rewritable type optical recording medium to be adjacent with each other in this order, thereby recording a third test signal thereon, reproducing the third test signal recorded on the eighth track, judging whether or not signal characteristics of the thus obtained reproduced signal satisfy reference conditions, changing, when the signal characteristics of the reproduced signal do not satisfy the reference conditions, the level of the recording power of the laser beam and recording the third test signal onto the eighth track and the ninth track in this order formed on the data rewritable type optical recording medium to be adjacent with each other until signal characteristics of a reproduced signal obtained by reproducing the third test signal recorded on the eighth track satisfy the reference conditions, reproducing the third test signal recorded on the eighth track and measuring an amplitude of the thus obtained reproduced signal, thereby obtaining the amplitude D2, reproducing the third test signal recorded on the ninth track and measuring an amplitude of the thus obtained reproduced signal, thereby obtaining the amplitude D3, and determining the fourth parameter as a function of a difference between the amplitude D3 of the reproduced signal obtained from the ninth track and the amplitude D2 of the reproduced signal obtained from the eighth track.

The above and other objects of the present invention can be also accomplished by a method for determining a critical parameter used for determining a recording power of a laser beam to be projected onto a data rewritable type optical recording medium for recording data therein, the method for determining a critical parameter used for determining the recording power of the laser beam comprising steps of setting the recording power of the laser beam to a predetermined level, sequentially projecting the laser beam onto a first track, a second track and a third track formed on the data rewritable type optical recording medium to be adjacent with each other in this order, thereby recording a first test signal thereon, reproducing the first test signal recorded on the second track, measuring an amplitude A1 and jitter J1 of the thus obtained reproduced signal, reproducing the first test signal recorded on the third track, measuring an amplitude A1 of the thus obtained reproduced signal, calculating a first parameter as a function of a difference between the amplitude A0 of the reproduced signal obtained from the third track and the amplitude A1 of the reproduced signal obtained from the second track, directly overwriting the first test signal recorded on the first track and the first test signal recorded on the third track with the first test signal predetermined times equal to a predetermined number of times x until an influence of cross erasing of data on the first test signal recorded on the second track has become saturated, reproducing the first test signal recorded on the second track, measuring an amplitude A(x+1) and jitter J(x+1) of the thus obtained reproduced signal, calculating a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal, repeatedly performing the above identified steps while varying levels of the recording power of the laser beam by α within a predetermined range, calculating the first parameter, the second parameter and the third parameter for each of the levels of the recording power of the laser beam, obtaining a value of the first parameter corresponding to a value of the second parameter when the third parameter is equal to a tolerance, and determining the thus obtained value of the first parameter as a critical parameter.

In a preferred aspect of the present invention, the method for determining a power of a laser beam comprises steps of projecting the laser beam onto a fourth track, a fifth track and a sixth track in this order formed on the data rewritable type optical recording medium to be adjacent with each other, thereby recording a second test signal, reproducing the second test signal recorded on the fifth track, measuring jitter JJ1 of the thus reproduced signal, reproducing the second test signal recorded on the fifth track, measuring jitter JJ0 of the thus reproduced signal, projecting the laser beam onto the fourth track and the sixth track y times where y is a positive integer, thereby directly overwriting the second test signal recorded on the fourth track and the second test signal recorded on the sixth track with the second test signal, reproducing the second test signal recorded on the fifth track, measuring jitter JJ(n+1) of the thus reproduced signal where n is an integer equal to or larger than 0 and equal to or smaller than y, obtaining for each of the levels of the recording power of the laser beam, a value of nc of n at which a function of a difference between JJ(n+1) and JJ0 becomes constant, and determining the maximum value of nc as the predetermined number of times x.

The above and other objects of the present invention can be also accomplished by a data rewritable type optical recording medium recorded with a critical parameter used for determining a recording power of a laser beam, the critical parameter being determined by setting the recording power of the laser beam to a predetermined level, projecting the laser beam onto a first track, a second track and a third track in this order formed on the data rewritable type optical recording medium to be adjacent with each other, thereby recording a first test signal, reproducing the first test signal recorded on the second track, measuring jitter JJ1 of the thus reproduced signal, reproducing the first test signal recorded on the third track, measuring jitter JJ0 of the thus reproduced signal, projecting the laser beam onto the first track and the third track y times where y is a positive integer, thereby directly overwriting the first test signal recorded on the first track and the first test signal recorded on the third track with the first test signal, reproducing the first test signal recorded on the second track, measuring jitter JJ(n+1) of the thus reproduced signal where n is an integer equal to or larger than 0 and equal to or smaller than y, obtaining, for each of the levels of the recording power of the laser beam, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal, setting the recording power of the laser beam to a predetermined level, projecting the laser beam onto a fourth track, a fifth track and a sixth track in this order formed on the data rewritable type optical recording medium to be adjacent with each other, thereby recording a second test signal thereon, reproducing the second test signal recorded on the fifth track, measuring an amplitude A1 and jitter J1 of the thus reproduced signal, reproducing the second test signal recorded on the sixth track, measuring an amplitude A0 of the thus reproduced signal, calculating, for each of the levels of the recording power of the laser beam, a first parameter as a function of a difference between the amplitude A0 of the reproduced signal obtained from the sixth track and the amplitude A1 of the reproduced signal obtained from the fifth track, directly overwriting the second test signal recorded on the fourth track and the second test signal recorded on the sixth track with the second test signal x times, reproducing the second test signal recorded on the fifth track, measuring an amplitude A(x+1) and jitter J(x+1) of the thus reproduced signal, calculating, for each of the levels of the recording power of the laser beam, a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal, and obtaining a value of the first parameter corresponding to a value of the second parameter when the third parameter is equal to a tolerance.

The above and other objects of the present invention can be also accomplished by a data recording apparatus storing a critical parameter used for determining a recording power of a laser beam so as to be associated with ID data for identifying a kind of an optical recording medium, the critical parameter being determined by setting the recording power of the laser beam to a predetermined level, sequentially projecting the laser beam onto a first track, a second track and a third track in this order formed on the data rewritable type optical recording medium to be adjacent with each other, thereby recording a first test signal thereon, reproducing the first test signal recorded on the second track, measuring jitter JJ1 of the thus reproduced signal, reproducing the first test signal recorded on the third track, measuring jitter JJ0 of the thus reproduced signal, projecting the laser beam onto the first track and the third track y times where y is a positive integer, thereby directly overwriting the first test signal recorded on the first track and the first test signal recorded on the third track with the first test signal, reproducing the first test signal recorded on the second track, measuring jitter JJ(n+1) of the thus reproduced signal where n is an integer equal to or larger than 0 and equal to or smaller than y, obtaining, for each of the levels of the recording power of the laser beam, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal, setting the recording power of the laser beam to a predetermined level, projecting the laser beam onto a fourth track, a fifth track and a sixth track in this order formed on the data rewritable type optical recording medium to be adjacent with each other, thereby recording a second test signal thereon, reproducing the second test signal recorded on the fifth track, measuring an amplitude A1 and jitter J1 of the thus reproduced signal, reproducing the second test signal recorded on the sixth track, measuring an amplitude A0 of the thus reproduced signal, calculating, for each of the levels of the recording power of the laser beam, a first parameter as a function of a difference between the amplitude A0 of the reproduced signal obtained from the sixth track and the amplitude A1 of the reproduced signal obtained from the fifth track, directly overwriting the second test signal recorded on the fourth track and the second test signal recorded on the sixth track with the second test signal x times, reproducing the second test signal recorded on the fifth track, measuring an amplitude A(x+1) and jitter J(x+1) of the thus reproduced signal, calculating, for each of the levels of the recording power of the laser beam, a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal, and obtaining a value of the first parameter corresponding to a value of the second parameter when the third parameter is equal to a tolerance.

The above and other objects of the present invention can be also accomplished by a data recording apparatus storing an optimum recording power of a laser beam so as to be associated with ID data for identifying a kind of an optical recording medium, the optimum recording power of the laser beam being determined by setting the recording power of the laser beam to a predetermined level, projecting the laser bean onto a first track, a second track and a third track in this order formed on the data rewritable type optical recording medium to be adjacent with each other, thereby recording a first test signal, reproducing the first test signal recorded on the second track, measuring jitter JJ1 of the thus reproduced signal, reproducing the first test signal recorded on the third track, measuring jitter JJ0 of the thus reproduced signal, projecting the laser beam onto the first track and the third track y times where y is a positive integer, thereby directly overwriting the first test signal recorded on the first track and the first test signal recorded on the third track with the first test signal, reproducing the first test signal recorded on the second track, measuring jitter JJ(n+1) of the thus reproduced signal where n is an integer equal to or larger than 0 and equal to or smaller than y, obtaining, for each of the levels of the recording power of the laser beam, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal, setting the recording power of the laser beam to a predetermined level, projecting the laser beam onto a fourth track, a fifth track and a sixth track in this order formed on the data rewritable type optical recording medium to be adjacent with each other, thereby recording a second test signal thereon, reproducing the second test signal recorded on the fifth track, measuring an amplitude A1 and jitter J1 of the thus reproduced signal, reproducing the second test signal recorded on the sixth track, measuring an amplitude A0 of the thus reproduced signal, calculating, for each of the levels of the recording power of the laser beam, a first parameter as a function of a difference between the amplitude A0 of the reproduced signal obtained from the sixth track and the amplitude A1 of the reproduced signal obtained from the fifth track, directly overwriting the second test signal recorded on the fourth track and the second test signal recorded on the sixth track with the second test signal x times, reproducing the second test signal recorded on the fifth track, measuring an amplitude A(x+1) and jitter J(x+1) of the thus reproduced signal, calculating, for each of the levels of the recording power of the laser beam, a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal, obtaining a value of the first parameter corresponding to a value of the second parameter when the third parameter is equal to a tolerance, thereby determining a critical parameter used for determining the recording power of the laser beam, setting the recording power of the laser beam to a predetermined level, projecting the laser beam onto a seventh track, an eighth track, and a ninth track in this order formed on data rewritable type optical recording medium to be adjacent with each other, thereby recording a third signal, reproducing the third test signal recorded on the seventh track, judging whether or not signal characteristics of the thus reproduced signal satisfy reference conditions, changing, when the signal characteristics of the reproduced signal do not satisfy the reference conditions, the level of the recording power of the laser beam and recording the third test signal onto the eighth track and the ninth track in this order formed on the data rewritable type optical recording medium to be adjacent with each other until signal characteristics of a reproduced signal obtained by reproducing the third test signal recorded on the eighth track satisfy the reference conditions, reproducing the third test signal recorded on the eighth track and measuring an amplitude of the thus obtained reproduced signal, thereby obtaining the amplitude D2, reproducing the third test signal recorded on the ninth track and measuring an amplitude D3 of the thus obtained reproduced signal, determining the fourth parameter as a function of a difference between the amplitude D3 of the reproduced signal obtained from the eighth track and the amplitude D2 of the reproduced signal obtained from the eighth track, comparing the critical parameter and the fourth parameter, and obtaining the recording power of the laser beam at which the fourth parameter was obtained when the fourth parameter is equal to or smaller than the critical parameter.

The above and other objects and features of the present invention will become apparent from the following description made with reference to the accompanying drawings.

DESCRIPTION OF THE PREFERRED EMBODIMENTS

A preferred embodiment of the present invention will now be described with reference to accompanying drawings.

Figure 1:
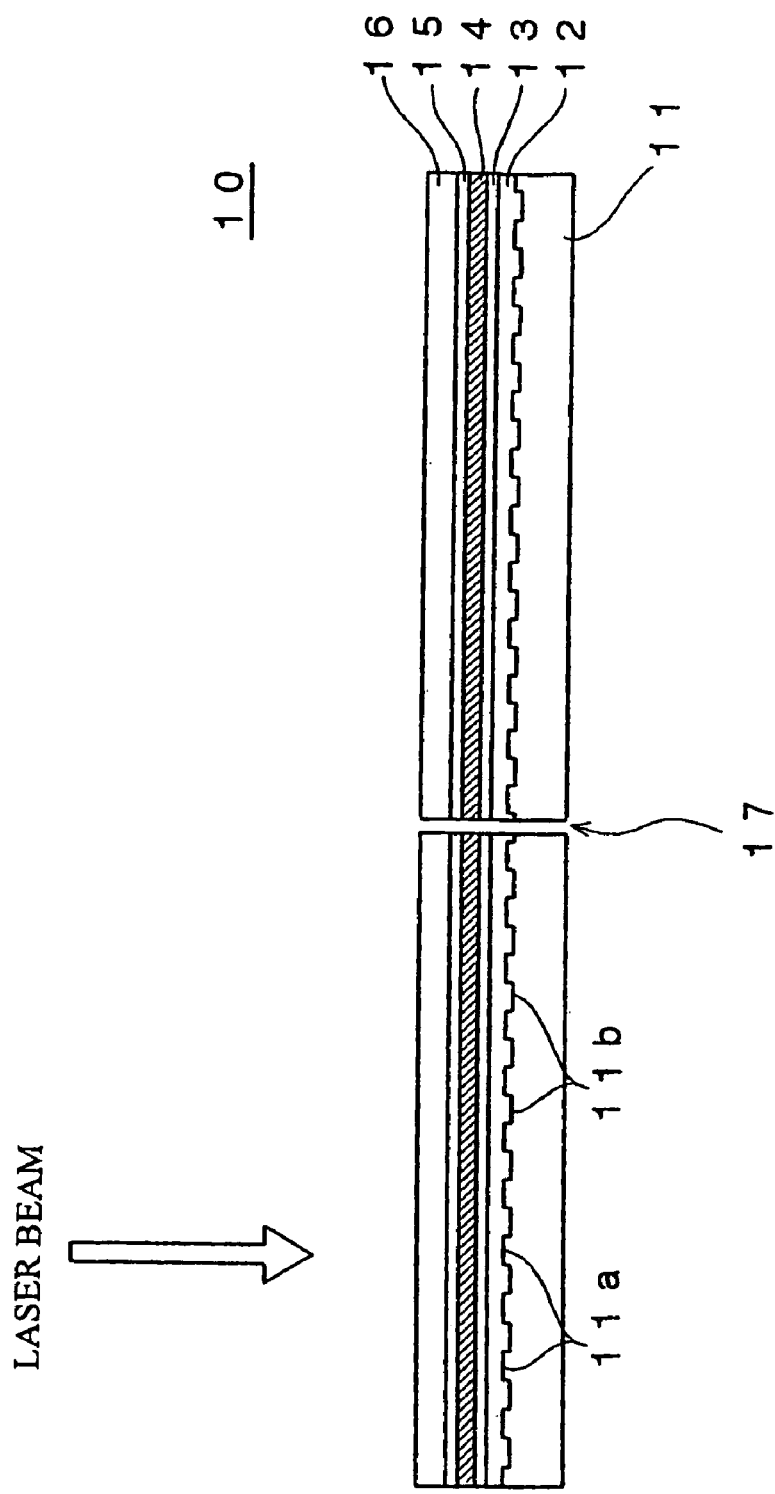
FIG. 1 is a schematic perspective view showing the structure of an optical recording medium that is a preferred embodiment of the present invention.

FIG. 1 is a schematic perspective view showing the structure of an optical recording medium 10 that is a preferred embodiment of the present invention.

As shown in FIG. 1, the optical recording medium 10 according to this embodiment is constituted as a data rewritable type optical recording medium and includes a substrate 11, a reflective layer 12 formed on the surface of the substrate 11, a second dielectric layer 13 formed on the surface of the reflective layer 12, a recording layer 14 formed on the surface of the second dielectric layer 13, a first dielectric layer 15 formed on the surface of the recording layer 14 and a light transmission layer 16 formed on the surface of the first dielectric layer 15.

As FIG. 1, a center hole 17 is formed at the center portion of the optical recording medium 10.

As FIG. 1, in this embodiment, data are recorded in the optical recording medium 10 and data are reproduced from the optical recording medium 10 by projecting a laser beam onto the surface of the light transmission layer 16.

The substrate 11 serves as a support for ensuring mechanical strength required for the optical recording medium 10.

The material used to form the substrate 11 is not particularly limited insofar as the substrate 11 can serve as the support of the optical recording medium 10. The substrate 11 can be formed of glass, ceramic, resin or the like. Among these, resin is preferably used for forming the substrate 11 since resin can be easily shaped. Illustrative examples of resins suitable for forming the substrate 11 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the support substrate 11 from the viewpoint of easy processing, optical characteristics and the like.

In this embodiment, the substrate 11 has a thickness of about 1.1 mm.

The shape of the substrate 11 is not particularly limited but the substrate 11 is normally formed to be disc-like, card-like or sheet-like.

As shown in FIG. 1, grooves 11a and lands 11b are alternately formed on the surface of the substrate 11. The grooves 11a and/or lands 11b serve as a guide track for the laser beam when data are to be recorded or when data are to be reproduced.

The reflective layer 12 serves to reflect the laser beam entering through the light transmission layer 16 so as to emit it from the light transmission layer 16.

The thickness of the reflective layer 12 is not particularly limited but it is preferable to form the reflective layer 12 so as to have a thickness of 10 nm to 300 nm and particularly preferable to form it so as to have a thickness of 20 nm to 200 nm.

The material usable for forming the reflective layer 12 is not particularly limited insofar as it can reflect a laser beam, and the reflective layer 12 can be formed of Mg, Al, Ti, Cr, Fe, Co, Ni, Cu, Zn, Ge, Ag, Pt, Au and the like. Among these materials, it is preferable to form the reflective layer 12 of a metal material having a high reflectivity, such as Al, Au, Ag, Cu or alloy containing at least one of these metals, such as alloy of Ag and Ti.

The reflective layer 12 also serves to increase the difference in reflectivity between a recorded region and an unrecorded region by a multiple interference effect, thereby obtaining a higher reproduced signal (C/N ratio) from data recorded in the recording layer 14.

The first dielectric layer 15 and the second dielectric layer 13 serve to protect the recording layer 14. Degradation of recorded data can be prevented over a long period by the first dielectric layer 15 and the second dielectric layer 13. Further, the second dielectric layer 13 can serve to prevent the substrate 11 and the like from being thermally deformed and it is therefore to effectively prevent jitter from becoming worse due to the deformation of the substrate 11 and the like.

The material used for forming the first dielectric layer 15 and the second dielectric layer 13 is not particularly limited insofar as it is a transparent dielectric material and the first dielectric layer 15 and the second dielectric layer 13 can be formed of a dielectric material containing oxide, sulfide, nitride or a combination thereof, for example, as a primary component. In order to prevent the support substrate 11 from being deformed by heat and to protect the first recording layer 31 and the second recording layer 32, it is preferable for each of the first dielectric layer 15 and the second dielectric layer 13 to contain at least one kind of dielectric material selected from a group consisting of $Al_2O_3$, AlN, ZnO, ZnS, GeN, GeCrN, CeO, $CeO_2$, SiO, $SiO_2$, SiN and SiC as a primary component and it is particularly preferable for it to contain $ZnS.SiO_2$ as a primary component.

The first dielectric layer 15 and the second dielectric layer 13 may be formed of the same dielectric material or of different dielectric materials. Moreover, at least one of the first dielectric layer 15 and the second dielectric layer 13 may have a multi-layered structure including a plurality of dielectric films.

In this specification, the statement that a dielectric layer contains a dielectric material as a primary component means that the content of the dielectric material is largest among dielectric materials contained in the dielectric layer and $ZnS.SiO_2$ means a mixture of ZnS and $SiO_2$.

The thickness of the first dielectric layer 15 and the second dielectric layer 13 is not particularly limited but is preferably from 3 nm to 200 nm. If the first dielectric layer 15 or the second dielectric layer 13 is thinner than 3 nm, it is difficult to obtain the above-described advantages. On the other hand, if the first dielectric layer 15 or the second dielectric layer 13 is thicker than 200 nm, it takes a long time to form the first dielectric layers 15 and the second dielectric layers 13, thereby lowering the productivity of the optical recording medium 10, and cracks may be generated in the first dielectric layers 15 or the second dielectric layers 13 owing to stress present in the first dielectric layers 15 or the second dielectric layer 13.

The recording layer 14 is a layer in which data are to be recorded. In this embodiment, the recording layer 14 is formed of a phase change material and data are recorded in the recording layer 14 and data are reproduced from the recording layer 14 by utilizing the difference in reflectivity between the recording layer 14 in a crystalline state and the recording layer 14 in an amorphous state.

The material for forming the recording layer 14 is not particularly limited but in order to directly overwrite data at a high velocity, it is preferable for the material for forming the recording layer 14 to be changed from an amorphous state to a crystalline state in a short time, in other words, to have a short crystallization time and illustrative examples of such materials includes an SbTe system material.

The SbTe system material may be a SbTe alone or may be added with additives in order to improve long term storage reliability.

Concretely, it is preferable to form the recording layer 14 of a SbTe system material represented by a general formula: $(Sb_xTe_{+x})_{+y}M_y$, where M is an element other than Sb and Te, x is equal to or larger than 0.55 and equal to or smaller than 0.9 and y is equal to or larger than 0 and equal to or smaller than 0.26 and it is more preferable to form the recording layer 14 of the SbTe system material represented by the above general formula where x is equal to or larger than 0.65 and equal to or smaller than 0.85 and y is equal to or larger than 0 and equal to or smaller than 0.25.

The element M is not particularly limited but in order to shorten the crystallization time and improve long term storage reliability, it is preferable for the element M to be at least one element selected from the group consisting of In, Ag, Au, Bi, Se, Al, P, Ge, H, Si, C, V, W, Ta, Zn, Mn, Ti, Sn, Pb, Pd, N, O and rare earth elements (Se, Y and lanthanoid) as a primary component. Particularly, in order to improve long term storage reliability, it is preferable for the element M to be at least one element selected from the group consisting of Ag, In, Ge and rare earth elements.

It is preferable to form the recording layer 14 so as to have a thickness of 5 nm to 30 nm and is particularly preferable to form the recording layer 14 so as to have a thickness of 5 nm to 20 nm.

The light transmission layer 16 is a layer through which the laser beam is transmitted and the surface thereof forms a light incidence plane of the laser beam.

It is preferable for the light transmission layer 16 to have a thickness of 10 μm to 300 μm and more preferable for the light transmission layer 16 to have a thickness of 50 μm to 150 μm.

The material for forming the light transmission layer 16 is not particularly limited. In the case where the light transmission layer 16 is formed using a spin coating method or the like, it is preferable to form the light transmission layer 16 of ultraviolet ray curable resin, electron beam curable resin or the like and it is more preferable to form the light transmission layer 16 of ultraviolet ray curable resin.

The light transmission layer 16 may be formed by adhering a sheet formed of light transmittable resin onto the surface of the first dielectric layer 15 using an adhesive agent.

The optical recording medium 10 having the above described configuration can be manufactured as follows, for example.

First, the reflective layer 12 is formed on the surface of the substrate 11 formed with the grooves 11a and the lands 11b.

The reflective layer 12 can be formed by a gas phase growth process using chemical species containing elements for forming the reflective layer 12, for example. Illustrative examples of the gas phase growth processes include vacuum deposition process, sputtering process and the like.

Then, the second dielectric layer 13 is formed on the surface of the reflective layer 12.

The second dielectric layer 13 can be formed by a gas phase growth process using chemical species containing elements for forming the second dielectric layer 13, for example. Illustrative examples of the gas phase growth processes include vacuum deposition process, sputtering process and the like.

Further, the recording layer 14 is formed on the surface of the second dielectric layer 13. Similarly to the second dielectric layer 13, the recording layer 14 can be formed by a gas phase growth process using chemical species containing elements for forming the recording layer 14.

Then, the first dielectric layer 15 is formed on the surface of the recording layer 14. The first dielectric layer 15 can be formed by a gas phase growth process using chemical species containing elements for forming the first dielectric layer 15.

Finally, the light transmission layer 16 is formed on the surface of the first dielectric layer 15. The light transmission layer 16 can be formed, for example, by applying acryl system ultraviolet ray curable resin or epoxy system ultraviolet ray curable resin whose viscosity is adjusted onto the surface of the first dielectric layer 15 using a spin coating process or the like to form a coating layer and projecting an ultraviolet ray onto the coating layer to harden it.

Thus, the optical recording medium 10 has been fabricated.

In this embodiment, prior to shipping the thus fabricated optical recording medium 10, ID data for identifying the optical recording medium 10 is recorded by the optical recording medium manufacturer in the optical recording medium 10 together with a critical signal amplitude reduction ratio Rc used for determining the recording power Pw of the laser beam described later in the form of wobbles or pre-pits.

When data are to be recorded in the optical recording medium 10 having the above described configuration, the optical recording medium 10 is set by the user in the data recording apparatus.

Figure 2:
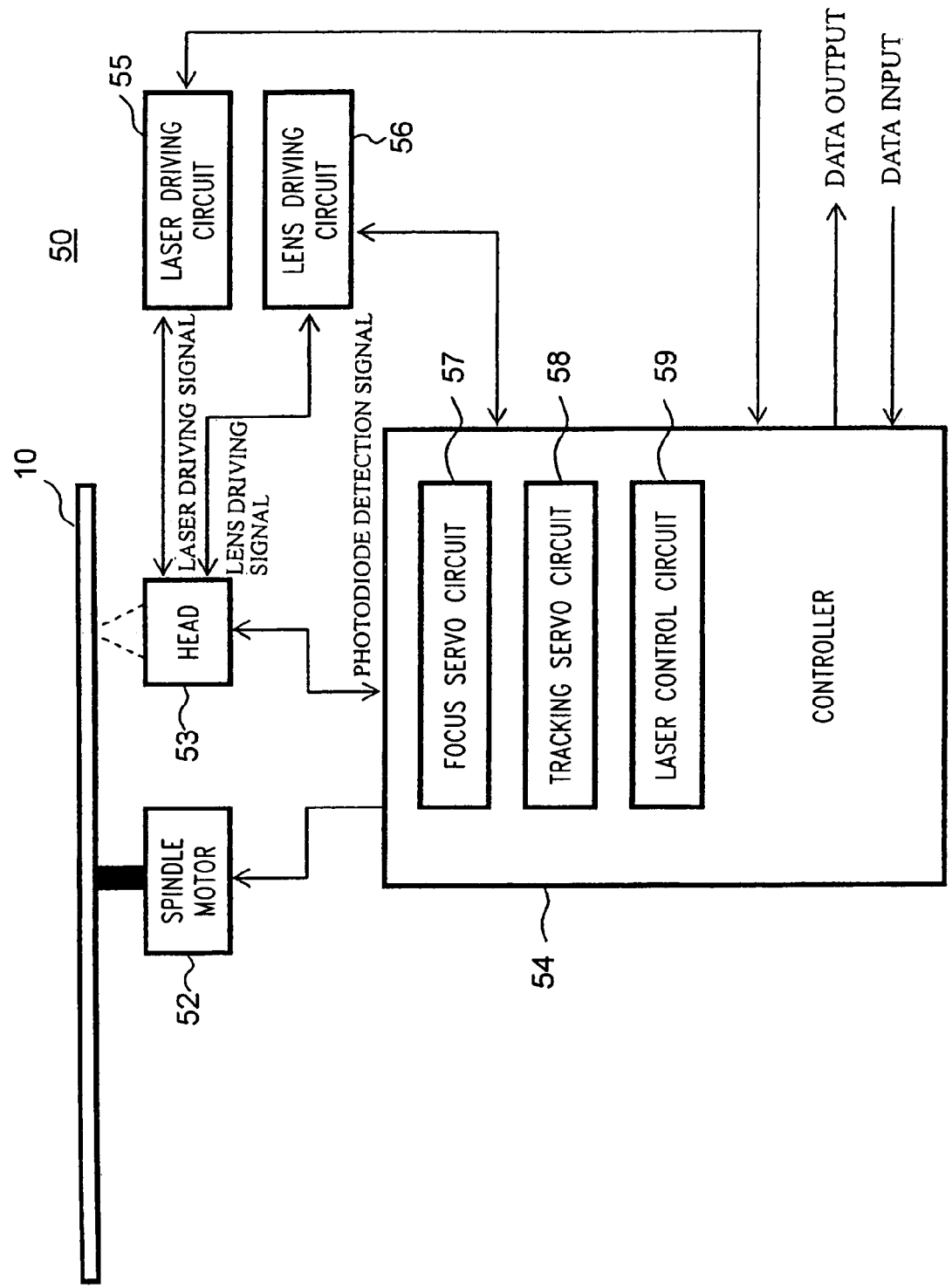
FIG. 2 is a block diagram of a data recording apparatus that is a preferred embodiment of the present invention.

FIG. 2 is a block diagram of a data recording apparatus that is a preferred embodiment of the present invention.

As shown in FIG. 2, the data recording apparatus 50 includes a spindle motor 52 for rotating the optical recording medium 10, a head 53 for emitting a laser beam toward the optical recording medium 10 and receiving a laser beam reflected from the optical recording medium 10, a controller 54 for controlling the spindle motor 52 and the head 53, a laser driving circuit 55 for feeding a laser driving signal to the head 53, and a lens driving circuit 56 for feeding a lens driving signal to the head 53.

As shown in FIG. 2, the controller 54 includes a focus servo circuit 57, a tracking servo circuit 68 and a laser control circuit 59.

When the focus servo circuit 57 is activated, the laser beam is automatically focused onto the recording layer 14 of the optical recording medium 10 and when the tracking servo circuit 58 is activated, the spot of the laser beam automatically follows the track of the optical recording medium 10.

Each of the focus servo circuit 57 and the tracking servo circuit 58 has an auto-gain control function for automatically adjusting the focus gain and an auto-gain control function for automatically adjusting the tracking gain.

Further, the laser control circuit 59 is adapted to generate a laser driving signal to be supplied by the laser driving circuit 55.

When the optical recording medium 10 is set in the data recording apparatus, the controller 54 reads ID data and a critical signal amplitude reduction ratio Rc used for determining the recording power Pw of the laser beam described later which are recorded in the optical recording medium 10.

In this embodiment, a linear recording velocity for data and data for setting data recording conditions including a pulse train pattern for modulating the power of the laser are determined in advance in accordance with an optical recording medium 10 and are stored in a memory (not shown) of the data recording apparatus so as to correspond to the ID data recorded in the optical recording medium 10. Therefore, the controller 54 reads the linear recording velocity for data and the pulse train pattern for modulating the power of the laser from the memory based on the thus read ID data of the optical recording medium 10 and first determines the level of a recording power Pw of the pulse train pattern for modulating the power of the laser from.

Figure 3:
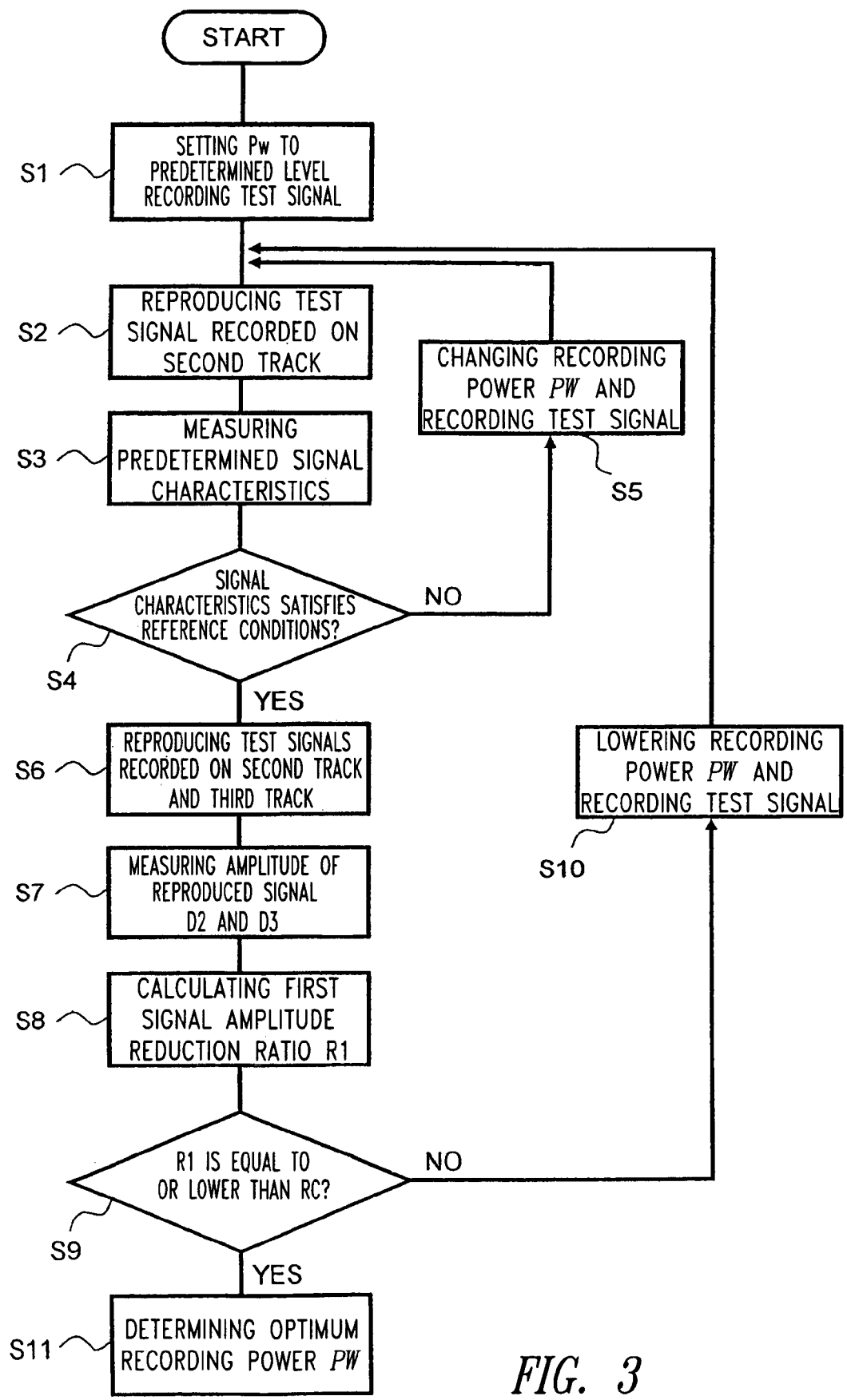
FIG. 3 is a flow chart showing a laser beam recording power determination routine for determining the level of a recording power Pw of a pulse train pattern for modulating the power of a laser beam.

FIG. 3 is a flow chart showing a laser beam recording power determination routine for determining the level of a recording power Pw of a pulse train pattern for modulating the power of a laser beam.

When the controller 54 has read the data for setting data recording conditions stored in the memory, the controller 54 sets the level of the recording power Pw to a predetermined level based on a table stored in the memory (not shown), thereby determining a recording power determination signal and outputs it together with a recording condition setting signal to the laser driving circuit 55.

The laser driving circuit 55 controls the head 53 based on the thus input recording condition setting signal and recording power determination signal and records a test signal on three tracks adjacent with each other in a power calibration area of the optical recording medium 10 using the laser beam whose power is modulated in accordance with the pulse train pattern in which the level of the recording power Pw is set to a predetermined level (Step S1). The power calibration area is an area in which a test signal for determining the recording power Pw of the laser beam and the like are to be recorded and provided at an inner circumferential portion of an optical recording medium separately from an area where data are to be recorded.

The test signal may be a single signal or a random signal.

Figure 4:
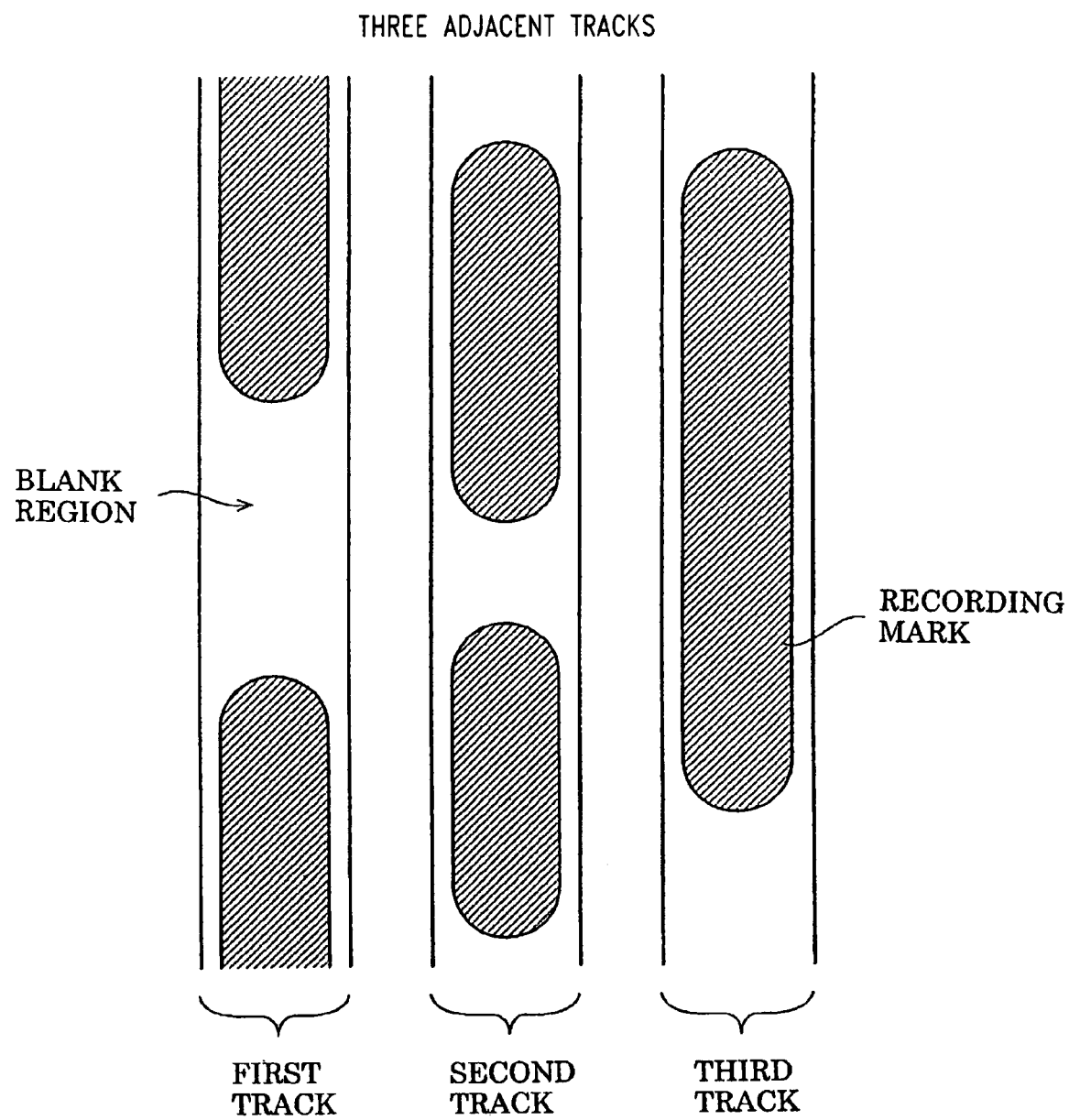
FIG. 4 is a schematic plan view showing three tracks adjacent with each other in a power calibration area of an optical recording medium in which a test signal is recorded.

FIG. 4 is a schematic plan view showing three tracks adjacent with each other in the calibration area of the optical recording medium 10 in which a test signal is recorded.

Figure 10A:
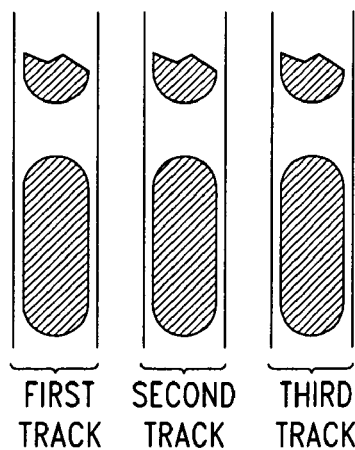
FIG. 10 is a schematic plan view shoeing three sets of tracks consisting of three adjacent tracks in a power calibration area of an optical recording medium in which a test signal is received.
Figure 10B:
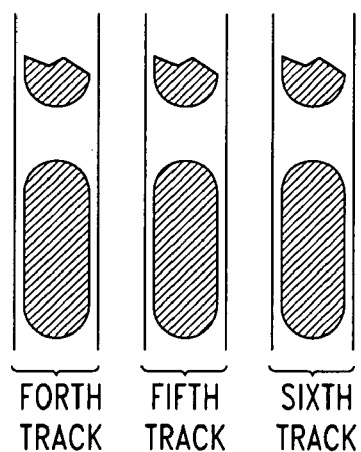
Figure 10C:
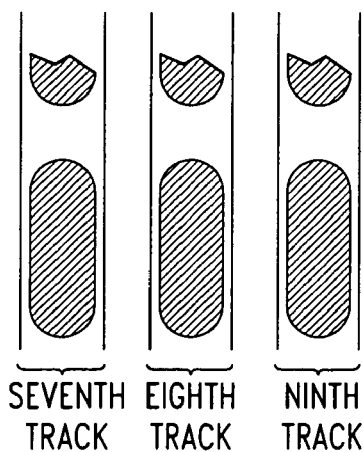

In FIG. 10C, a seventh track is a track in which the test signal in Step S1 was first recorded, the eighth track is a track in which the test signal was secondly recorded and the ninth track is a track in which the test signal was last recorded. The seventh track, the eighth track, and the ninth track can be any three adjacent tracks referred to above. For convenience, the seventh track, the eighth track, and ninth track will be referred to as the first track, the second track, and the third track respectively, for this particular FIG. 10C.

Therefore, when the test signal was written in the second track, cross erasing of data may have occurred in the first track and when the test signal was written in the third track, cross erasing of data may have occurred in the second track. To the contrary, since the test signal was last written in the third track, there is no risk of cross erasing of data occurring in the third track.

The controller 54 then sets the power of the laser beam to a reproducing power Pr and outputs a first data reproduction signal to the laser driving circuit 55.

When the laser driving circuit 55 receives the first data reproduction signal from the controller 54, the laser driving circuit 55 projects the laser beam whose power is set to the reproducing power Pr onto the second track in the power calibration area of the optical recording medium 10, thereby reproducing the test signal recorded on the second track (Step S2).

The controller 54 measures signal characteristics necessary for determining the recording power Pw of the laser beam such as asymmetry, a β value and the like based on the thus obtained reproduced signal (Step S3). The thus measured signal characteristics of the reproduced signal have been influenced by cross-talk from the tracks on the opposite sides thereof.

Then, the controller 54 judges whether or not the signal characteristics of the reproduced signal measured at Step S3 satisfy reference conditions (Step S4).

As a result, when the controller 54 judges that the signal characteristics of the reproduced signal measured at Step S3 do not satisfy the reference conditions, since it can be considered that the level of the recording power Pw of the laser beam set for recording the test signal is inappropriate, the controller 54 outputs a laser beam power change signal to the laser driving circuit 55 to change the recording power Pw of the laser beam and again records the test signal on the a first track, a second track and a third track (Step S5). In this case, as a first track, a second track and a third track, three tracks in which no signal is recorded and which are adjacent with each other are selected.

To the contrary, when the controller 54 judges that the signal characteristics of the reproduced signal satisfy the reference conditions, the controller 54 sets the power of the laser beam to a reproducing power Pr and a second data reproduction signal to the laser driving circuit 55.

When the laser driving circuit 55 receives the second data reproduction signal from the controller 54, the laser driving circuit 55 projects the laser beam whose power is set to the reproducing power Pr onto the second track and the third track in the power calibration area of the optical recording medium 10, thereby reproducing the test signal recorded on the second track and the third track (Step S6).

Then, the controller 54 measures an amplitude of the thus obtained reproduced signal (Step S7). Here, the amplitude of the reproduced signal corresponds to a difference in reflectivity between a region of the recording layer 14 in which a recording mark is formed and a blank region of the recording layer 14 in which no recording mark is formed and in the case where a random signal was recorded as the test signal, the difference in reflectivity between the longest recording mark and a neighboring blank region was measured as an amplitude of the reproduced signal.

As described above, since the test signal recorded on the third track was not influenced by cross erasing of data while the test signal recorded on the second track may have been influenced by cross erasing of data, the amplitude D2 of the reproduced signal obtained from the second track becomes smaller than the amplitude D3 of the reproduced signal obtained from the third track.

Then, the controller 54 calculates a first signal amplitude reduction ratio R1 based on the amplitude D2 of the reproduced signal obtained from the second track and the amplitude D3 of the reproduced signal obtained from the third track (Step S8). The first signal amplitude reduction ratio R1 is defined as (D3−D2)/D3.

Further, the controller 54 judges whether or not the thus calculated first signal amplitude reduction ratio R1 is equal to or smaller than a critical signal amplitude reduction ratio Rc determined in a method described later, recorded in the optical recording medium 10 and read from the optical recording medium 10 when the optical recording medium 10 is set in the data recording apparatus (Step S9).

As a result, when the controller 54 judges that the first signal amplitude reduction ratio R1 is equal to or smaller than the critical signal amplitude reduction ratio Rc, since it can be considered that the test signal has not been greatly influenced by cross erasing of data, the controller 54 determines the recording power Pw of the laser beam used for recording the test signal on the second track as an optimum recording power (Step S11).

To the contrary, when the controller 54 judges that the first signal amplitude reduction ratio R1 exceeds the critical signal amplitude reduction ratio Rc, since it can be considered that the test signal has been greatly influenced by cross erasing of data and it is necessary to record data using the laser beam whose recording power Pw is set to a lower level, the controller 54 sets the recording power Pw of the laser beam to a lower level and outputs a laser beam power change signal to the laser driving circuit 55 so as to record the test signal on the a first track, a second track and a third track using the laser beam whose recording power Pw is set to a lower level (Step S10). In this case, as a first track, a second track and a third track, three tracks in which no signal is recorded and which are adjacent with each other are selected.

The above described steps are repeated until the first signal amplitude reduction ratio R1 becomes equal to or smaller than the critical signal amplitude reduction ratio Rc and when the first signal amplitude reduction ratio R1 has become equal to or smaller than the critical signal amplitude reduction ratio Rc, the recording power Pw of the laser beam used for recording the test signal on the second track is determined as an optimum recording power of the laser beam (Step S11).

In this embodiment, prior to shipping the optical recording medium 10, the critical signal amplitude reduction ratio Rc is determined by the optical recording medium manufacturer at Step S9 in the following manner and is recorded together with the data for setting recording conditions in the optical recording medium 10 in the form of wobbles or pre-pits.

Figure 5:
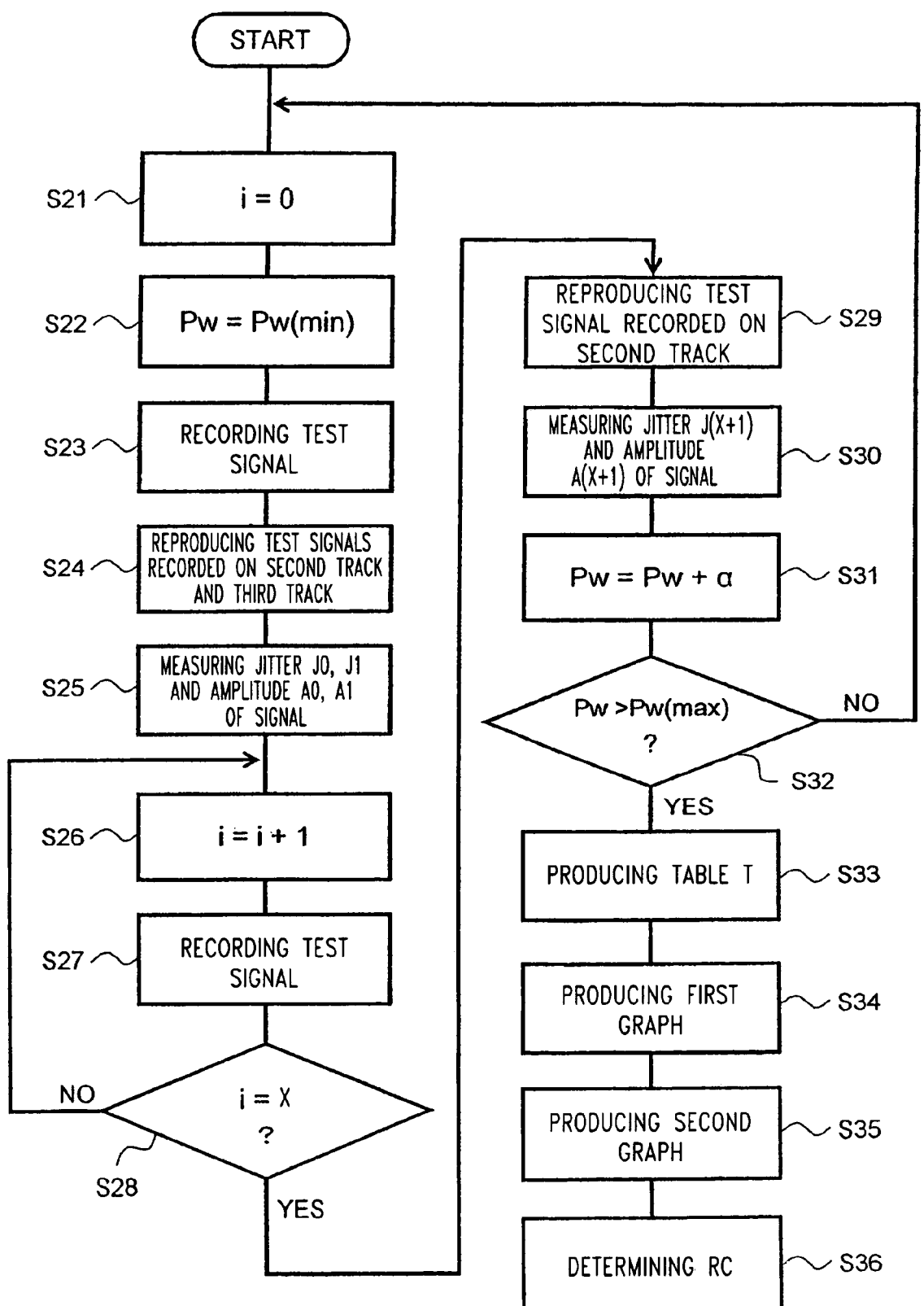
FIG. 5 is a flow chart showing a critical signal amplitude reduction ratio determination routine for the ratio Rc of reduction in the amplitude of a critical signal.

FIG. 5 is a flow chart showing a critical signal amplitude reduction ratio determination routine for the critical signal amplitude reduction ratio Rc.

A variable i is first set to zero (Step S21).

Then, a pulse train pattern used for modulating the power of the laser beam and a linear recording velocity used when data are to be recorded in the optical recording medium 10 are determined and the recording power Pw of the laser beam is set to the minimum level Pw(min) determined in advance (Step S22). The laser beam is then projected onto a first track, a second track and a third track adjacent with each other in the power calibration area of the optical recording medium 10, thereby recording a test signal thereon (Step S23).

Here, similarly to in FIG. 4 and FIG. 10C, as shown in FIG. 10B, a fourth track is a track in which the test signal was first recorded, the fifth track is a track in which the test signal was secondly recorded and the sixth track is a track in which the test signal was last recorded. The fourth track, the fifth track, and the sixth track can be any adjacent tracks referred to above. For convenience, the fourth track, the fifth track, and sixth track will be referred to as the first track, the second track, and the third track respectively, for this particular FIG. 10B.

The test signal may be a single signal or a random signal.

Then, the test signal recorded on the second track and the test signal recorded on the third track are reproduced (Step S24) and jitter and an amplitude of each of the thus reproduced signals are measured (Step S25).

While the jitter J0 and the amplitude A0 of the reproduced signal obtained by reproducing the test signal recorded on the third track are not influenced by cross erasing of data, the jitter J1 and the amplitude A1 of the reproduced signal obtained by reproducing the test signal recorded on the second track have been once influenced by cross erasing of data from the third track. Therefore, the jitter J1 of the reproduced signal obtained by reproducing the test signal recorded on the second track is normally higher than the jitter J0 of the reproduced signal obtained by reproducing the test signal recorded on the third track and the amplitude A1 of the reproduced signal obtained by reproducing the test signal recorded on the second track is normally smaller than the amplitude A0 of the reproduced signal obtained by reproducing the test signal recorded on the third track.

Then, the variable i is incremented by one, namely, i is set to (i+1) (Step S26) and the test signal recorded on the first track and the test to signal recorded on the third track are directly overwritten with the test signals under the same recording conditions as those used for recording the test signals at Step 23 (Step S27).

As a result, the test signal recorded on the second track is once influenced by cross erasing of data from the first track and has been twice influenced by cross erasing of data from the third track and therefore, in the case where the test signal recorded on the second track is reproduced, the jitter J2 of the thus obtained reproduced signal is much higher than the jitter J1 and the amplitude A2 of the reproduced signal is much smaller than the amplitude A1.

Step S26 and Step S27 are repeated until the variable i becomes x, in other words, until the test signal recorded on the first track and the test signal recorded on the third track have been directly overwritten x times.

Here, J is the number of times of the direct overwriting required for saturating the influence of cross erasing of data on the test signal recorded on the second track by directly overwriting the test signal recorded on the first track and the test signal recorded on the third track and is to be determined as described below.

When the variable i has become equal to x and the test signal recorded on the first track and the test signal recorded on the third track have been directly overwritten x times, the test signal recorded on the second track is reproduced (Step S29) and jitter J(x+1) and an amplitude A(x+1) of the thus reproduced signal are measured (Step S30).

The thus measured jitter J(x+1) and amplitude A(x+1) of the reproduced signal have been influenced by cross erasing of data x times from the first track and influenced by cross erasing of data (x+1) times from the third track.

Therefore, the jitter J(x+1) of the reproduced signal obtained by reproducing the test signal recorded on the second track is normally much higher than the jitter J1 and the amplitude A(x+1) of the reproduced signal obtained by reproducing the test signal recorded on the second track is normally much smaller than the amplitude A1. Here, since the test signal recorded on the first track and the test data recorded on the third track have been directly overwritten x times, the influences by cross erasing of data on the jitter J(x+1) and the amplitude A(x+1) have been saturated.

Further, the level of the recording power Pw of the laser beam is set to (Pw+a) (Step S31). Then, Step S21 to Step S31 are repeated and jitters J0, J1 and J(x+1) and amplitudes A0, A1 and A(x+1) of the reproduced signals obtained by reproducing the test signals recorded on the second track using each of the recording powers Pw are measured.

Thus, when it is judged that the level of the recording power Pw of the laser beam exceeds the maximum level Pw(max) determined in advance (Step S32), the measurement of the jitters J0, J1 and J(x+1) and the amplitudes A0, A1 and A(x+1) of the reproduced signals obtained by reproducing the test signals recorded on the second track and third track using each of the recording powers Pw of the laser beam is completed.

Figures 6, 7:
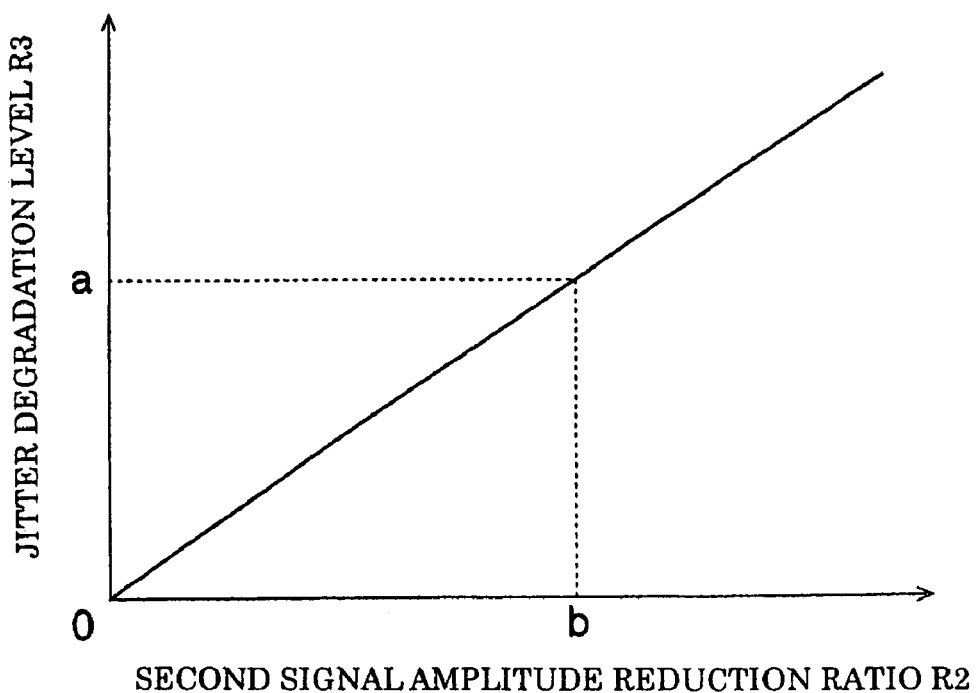
FIG. 6 is a table showing a first signal amplitude reduction ratio R1, a second signal amplitude reduction ratio R2 and a jitter degradation level R3.
FIG. 7 is a graph showing a relationship between a second signal amplitude reduction ratio R2 and a jitter degradation level R3.

Then, based on the thus measured jitters J0, J1 and J(x+1) and amplitudes A0, A1 and A(x+1) of the reproduced signals corresponding to the respective recording powers Pw of the laser beam, a first signal amplitude reduction ratio R1, a second signal amplitude reduction ratio R2 and a jitter degradation level R3 corresponding to each of the recording powers Pw of the laser beam are calculated and a table T shown in shown in FIG. 6 is produced (Step S33).

Here, the first signal amplitude reduction ratio R1 is defined as (A0−A1)/A0, the amplitude A0 corresponds to an amplitude D3 of a reproduced signal obtained by reproducing the test signal recorded on the third track at Step S7 of the laser beam recording power determination routine shown in FIG. 3 and the amplitude A1 corresponds to an amplitude D2 of a reproduced signal obtained by reproducing the test signal recorded on the second track at Step S7 of the laser beam recording power determination routine shown in FIG. 3.

Further, the second signal amplitude reduction ratio R2 is defined as {A1−A(x+1)}/A1 and the jitter degradation level R3 is defined as {J(x+1)−J1).

When the table T has been produced in this manner, based on the thus produced table T, a first graph showing the relationship between the second signal amplitude reduction ratio R2 and the jitter degradation level R3 is produced by plotting values of the second signal amplitude reduction ratio R2 and the jitter degradation level R3 (Step S34).

FIG. 7 is a first graph showing the relationship between the second signal amplitude reduction ratio R2 and the jitter degradation level R3. As shown in FIG. 7, the relationship between the second signal amplitude reduction ratio R2 and the jitter degradation level R3 can be normally approximated by a linear function.

Similarly, based on the thus produced table T, a second graph showing the relationship between the signal amplitude reduction ratio R1 and the signal amplitude reduction ratio R2 is produced by plotting values of the signal amplitude reduction ratio R1 and the signal amplitude reduction ratio R2 (Step S35).

Figure 8:
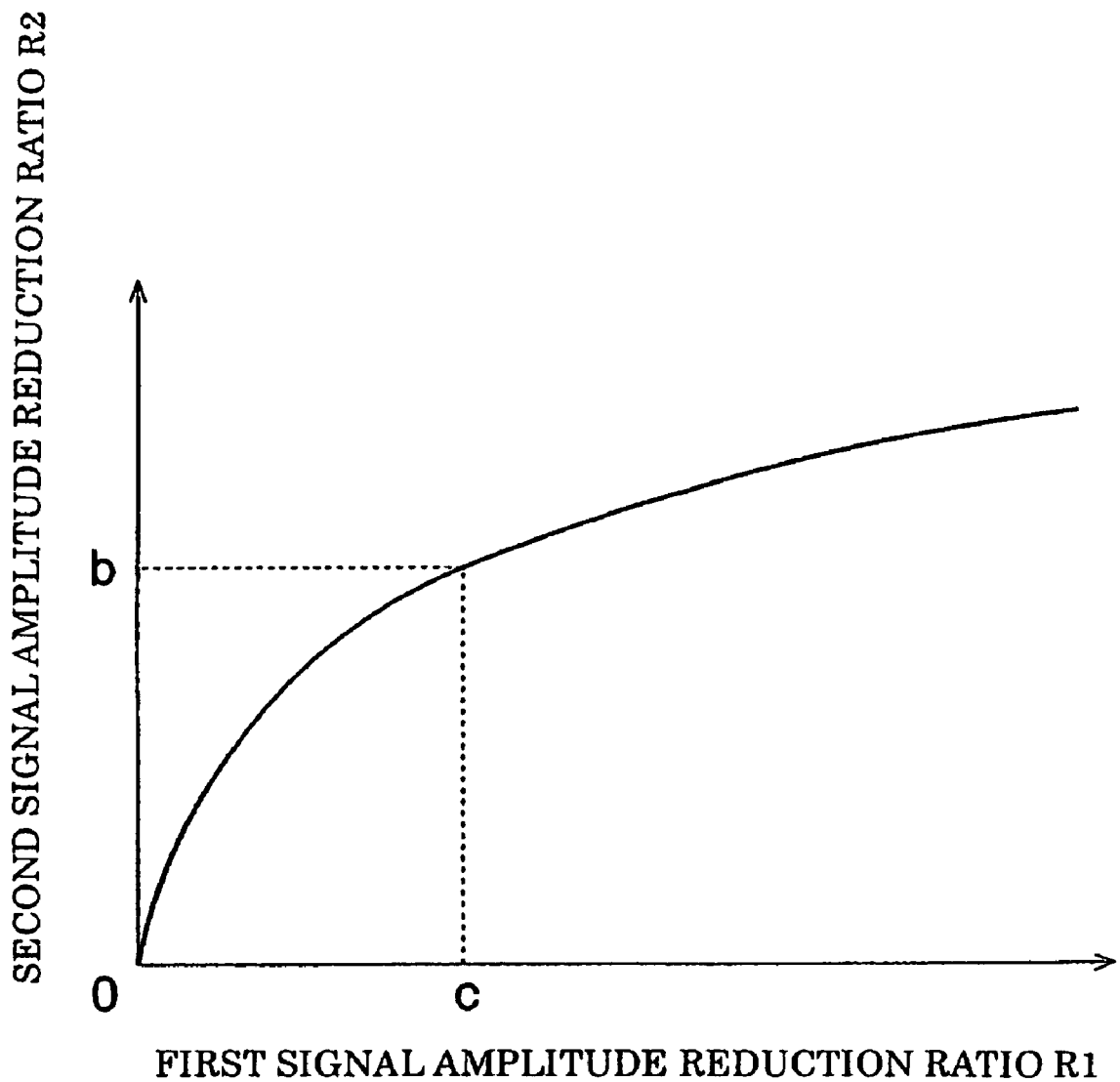
FIG. 8 is a graph showing a relationship between a first signal amplitude reduction ratio R1 and a second signal amplitude reduction ratio R2.

FIG. 8 is a second graph showing the relationship between the signal amplitude reduction ratio R1 and the signal amplitude reduction ratio R2. As shown in FIG. 8, the relationship between the signal amplitude reduction ratio R1 and the signal amplitude reduction ratio R2 can be normally approximated by a quadratic function.

When the first graph showing the relationship between the second signal amplitude reduction ratio R2 and the jitter degradation level R3 and the second graph showing the relationship between the signal amplitude reduction ratio R1 and the signal amplitude reduction ratio R2 have been produced in this manner, a value b of the second signal amplitude reduction ratio R2 corresponding to a value a of the allowable maximum jitter degradation level R3 is obtained based on the first graph shown in FIG. 7 and a value c of the signal amplitude reduction ratio R1 corresponding to the value b of the second signal amplitude reduction ratio R2 is obtained based on the second graph shown in FIG. 8, thereby determining the value c of the signal amplitude reduction ratio R1 as a critical signal amplitude reduction ratio Rc.

Since the jitter degradation level R3 is defined as the difference between the jitter J(x+1) of the reproduced signal obtained by reproducing the test signal recorded on the second track after directly overwriting the test signal recorded on the first track and the test signal recorded on the third track with the test signal x times and the jitter J1 of the reproduced signal obtained by reproducing the test signal recorded on the second track after recording the test signal on the first track and recording the test signal on the third track, and it can be considered that when the test signal recorded on the first track and the test signal recorded on the third track have been directly overwritten with the test signal x times, the influence of cross erasing of data on the test signal recorded on the second track has been saturated, the thus determined critical signal amplitude reduction ratio Rc corresponds to a critical jitter degradation level R3 at which the degradation of jitter can be permitted even when the test signal has been repeatedly influenced by cross erasing of data until the influence of cross erasing of data has been saturated. Therefore, it is possible to determine an optimum power of the recording power Pw of the laser beam with which the increase in jitter of a reproduced signal can be controlled within tolerance by judging whether or not the first signal amplitude reduction ratio R1 is equal to or smaller than a critical signal amplitude reduction ratio Rc at Step S9 of the laser beam recording power determination routine shown in FIG. 3.

When the optimum power of the recording power Pw of the laser beam has been determined in this manner, as shown in FIG. 1, the laser beam whose power is modulated in accordance with a pulse train pattern whose recording power Pw is set to the optimum power is projected onto the optical recording medium 10 from the side of the light transmission layer 16, thereby recording data in the recording layer 14 of the optical recording medium 10.

In this embodiment, the pulse train pattern includes pulses whose levels are set to a recording power Pw and a bottom power Pb.

When a recording mark is to be formed in the recording layer 14, a laser beam whose power is set to the Pw is projected onto a region of the recording layer 14 where the recording mark is to be formed.

As a result, a phase change material contained in the region of the recording layer 14 irradiated with the laser beam is heated to a temperature equal to or higher than the melting point thereof.

Then, the laser beam whose power is set to the bottom power Pb lower than the Pw is projected onto the region of the recording layer 14 where the recording mark is to be formed.

As a result, the phase change material heated to the temperature equal to or higher than the melting point thereof and melted is quickly cooled and the phase thereof is changed to an amorphous phase, thereby forming the recording mark in the recording layer.

To the contrary, when a recording mark formed in the recording layer 14 is to be erased, the laser beam whose power is set to an erasing power Pe is projected onto a region of the recording layer 14 where the recording mark is formed. Here, Pe is higher than Pb and lower than Pw.

As a result, a phase change material contained in the region of the recording layer 14 irradiated with the laser beam is heated to a temperature equal to or higher than the crystallization temperature thereof.

Then, the laser beam is moved away and the region of the recording layer 14 heated to the temperature equal to or higher than the crystallization temperature of the phase change material is gradually cooled. As a result, the region of the recording layer 14 in an amorphous state is crystallized, whereby the recording mark formed in the recording layer 14 is erased.

Therefore, it is possible to form a recording mark in the recording layer 14 and erase a recording mark formed in the recording layer 14 by modulating the power of the laser beam and it is further possible to form a different recording mark at the region of the recording layer 14 where a recording mark is formed and directly overwrite data recorded in the recording layer 14 with different data by modulating the power of the laser beam between the recording power Pw, the bottom power Pb and the erasing power Pe.

Thus, data are recorded in the recording layer 14 of the optical recording medium 10 by utilizing the difference in reflectivity between the case where the region of the recording layer 14 is in an amorphous phase and the case where the region of the recording layer 14 is in a crystalline phase.

Figure 9:
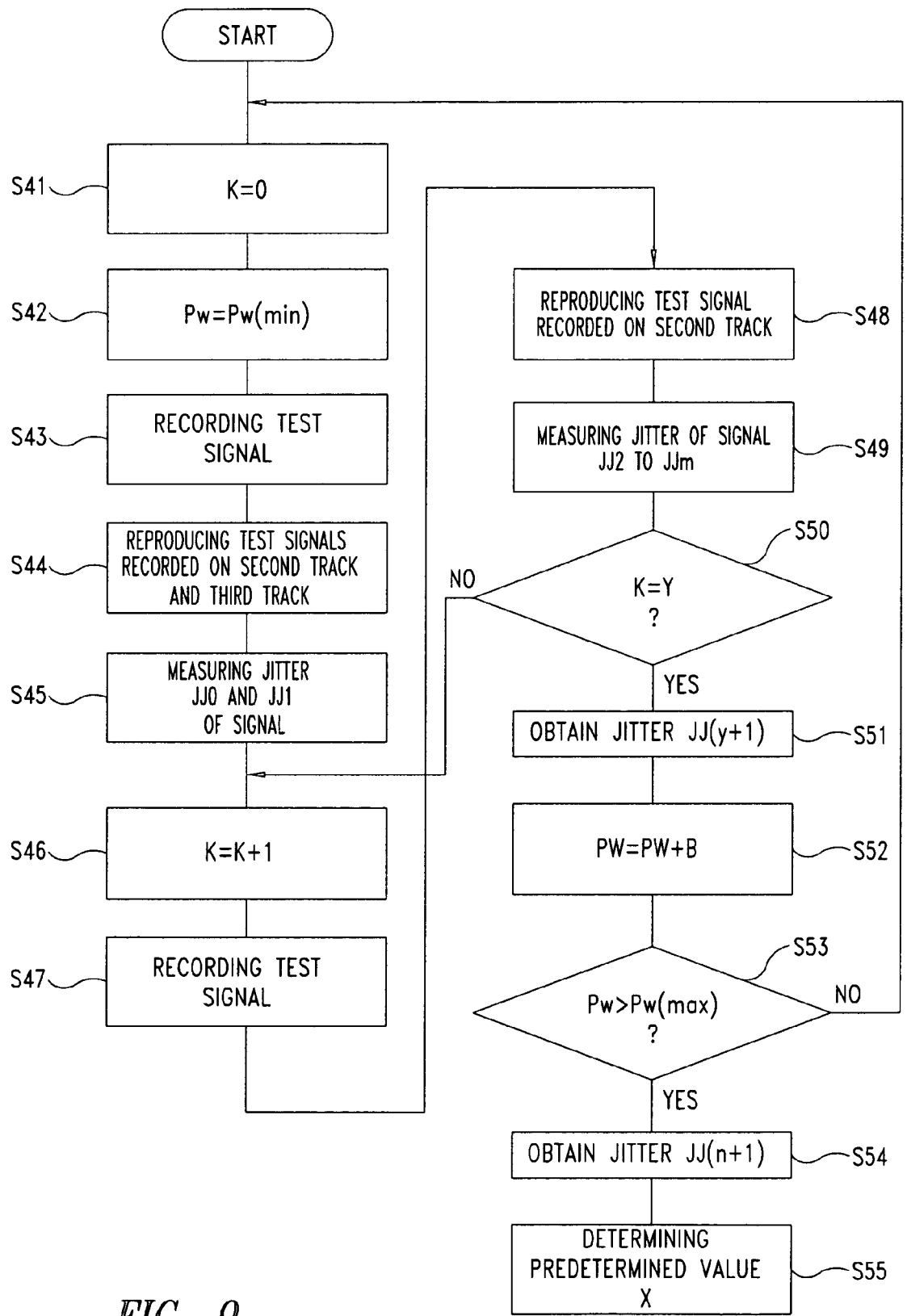
FIG. 9 is a flow chart showing a direct overwriting number determination routine for determining x used in a critical signal amplitude reduction ratio determination routine by which an influence of cross erasing of data on a test signal recorded on a second track becomes saturated by directly overwriting the test signal recorded on a first track and the test signal recorded on a third track with the test signal.

FIG. 9 is a flow chart showing a direct overwriting number determination routine for determining x used in the critical signal amplitude reduction ratio determination routine by which an influence of cross erasing of data on the test signal recorded on the second track is becomes saturated by directly overwriting the test signal recorded on the first track and the test signal recorded on the third track with the test signal.

In this embodiment, since the critical signal amplitude reduction ratio determination routine is performed by the optical recording medium manufacturer prior to shipping the optical recording medium 10, the direct overwriting number determination routine is also performed by the optical recording medium manufacturer.

When the number of times x of the direct overwriting required for saturating the influence of cross erasing of data on the test signal recorded on the second track by directly overwriting the test data recorded on the first track and the test data recorded on the third track is to be determined, a variable k is first set to 0 (Step S41).

Then, a pulse train pattern used for modulating the power of the laser beam and the linear recording velocity used when data are to be recorded in the optical recording medium 10 are determined, the recording power Pw of the laser beam is set to the minimum level Pw(min) determined in advance (Step S42) and the laser beam is projected onto a first track, a second track and a third track formed on the optical recording medium 10 to be adjacent with each other, thereby recording a test signal thereon (Step S43).

The minimum level Pw(min) of the recording power Pw of the laser beam used in the direct overwriting number determination routine may be the same level as that of the minimum level Pw(min) of the recording power Pw of the laser beam used in the critical signal amplitude reduction ratio determination routine but since it is unnecessary in the direct overwriting number determination routine to greatly change the level of the recording power of the laser beam to record a test signal, reproduce the test signal and measure jitter of the thus reproduced signal unlike in the case of determining the critical signal amplitude reduction ratio Rc, it is preferable to set the minimum level Pw(min) of the recording power Pw of the laser beam used in the direct overwriting number determination routine to a higher level than the minimum level Pw(min) of the recording power Pw of the laser beam used in the critical signal amplitude reduction ratio determination routine. However, it is necessary to set the minimum level Pw(min) of the recording power Pw of the laser beam used in the direct overwriting number determination routine to a higher level that that of the recording power Pw of the laser beam used for recording data.

Here, similarly to in FIG. 4, and FIGS. 10B and 10C, as shown in FIG. 10A, the first track is a track in which the test signal was first recorded, the second track is a track in which the test signal was secondly recorded and the third track is a track in which the test signal was last recorded. The first track, the second track, and the third track can be any three adjacent tracks as shown in FIG. 4.

The test signal may be a single signal or a random signal.

Then, the test signal recorded on the second track and the test signal recorded on the third track are reproduced (Step S44) and jitter of each of the thus reproduced signals are measured (Step S45).

While the jitter JJ0 of the reproduced signal obtained by reproducing the test signal recorded on the third track are not influenced by cross erasing of data, the jitter JJ1 of the reproduced signal obtained by reproducing the test signal recorded on the second track have been once influenced by cross erasing of data from the third track. Therefore, the jitter JJ1 of the reproduced signal obtained by reproducing the test signal recorded on the second track is normally higher than the jitter JJ0 of the reproduced signal obtained by reproducing the test signal recorded on the third track.

Then, the variable k is set to (k+1) (Step S46) and the test signal recorded on the first track and the test signal recorded on the third track are directly overwritten with the test signals under the same recording conditions as those used, for recording the test signals at Step 43 (Step S47).

Further, the test signal recorded on the second track is reproduced (Step S48) and jitter JJ2 of the thus reproduced signal is measured (Step S49).

Since the test signal recorded on the second track has been once influenced by cross erasing of data from the side of the first track and influenced by cross erasing of data from the side of the third track by directly overwriting the test signal recorded on the first track and the test data recorded on the third track, jitter JJ2 of a reproduced signal obtained by reproducing the test signal recorded on the second track is much higher than the jitter JJ1.

Step S46 to Step S49 are repeated until the variable k becomes a predetermined value y, in other words, until the test signal recorded on the first track and the test signal recorded on the third track have been directly overwritten y times. Then, the test signal recorded on the second track is reproduced and jitter JJm of the thus obtained reproduced signal is measured. Here, m is larger than 2 and smaller than y.

Here, the predetermined value y is set so that the influence by cross erasing of data on the test signal recorded on the second track has been reliably saturated by directly overwriting the test signal recorded on the first track and the test data recorded on the third track when the test signal recorded on the first track and the test data recorded on the third track have been directly overwritten y times using the laser beam whose power is modulated to an optimum recording power Pw and it has been found that when the test signal recorded on the first track and the test data recorded on the third track have been directly overwritten ten times using the laser beam whose power is modulated to an optimum recording power Pw, the influence by cross erasing of data on the test signal recorded on the second track by directly overwriting the test signal recorded on the first track and the test data recorded on the third track has been normally saturated. Therefore, it is preferable to set the predetermined value y to be larger than 10 and equal to or smaller than 20.

As a result, when the variable k has become a predetermined value y, the test signal recorded on the first track and the test data recorded on the third track have been directly overwritten y times and jitter JJ(y+1) of a reproduced signal obtained by reproducing the test signal recorded on the second track has been measured (Step S51), the level of the recording power Pw of the laser beam is further set to (Pw+β) (Step S52). Then, Steps S41 to 51 are repeated and jitter JJ0, JJ1, JJ2, . . . , JJm, . . . and JJ(y+1) of reproduced signals obtained by reproducing the test signal recorded on the second track are measured.

Here, β may be set to be the same as a used in the direct overwriting number determination routine but since it is unnecessary in the direct overwriting number determination routine to vary the level of the recording power of the laser beam little by little, record the test signal, reproduce the test signal and measure jitter of the reproduced signal unlike in the case of determining the critical signal amplitude reduction ratio Rc, it is preferable to set β used in the direct overwriting number determination routine to be larger than a used in the direct overwriting number determination routine.

Thus, when it is judged that the level of the recording power Pw of the laser beam exceeds the maximum level Pw(max) determined in advance (Step S53), the measurement of the jitter JJ0, JJ1, JJ2, . . . , JJm, . . . and JJ(y+1) of reproduced signals obtained by reproducing the test signals recorded on the second track for each levels of the recording power of the laser beam is completed.

Here, the maximum level Pw(max) used in the direct overwriting number determination routine may be set to the same level as that of the maximum level Pw(max) used in the critical signal amplitude reduction ratio determination routine but since it is unnecessary in the direct overwriting number determination routine to greatly change the level of the recording power of the laser beam to record a test signal, reproduce the test signal and measure jitter of the thus reproduced signal unlike in the case of determining the critical signal amplitude reduction ratio Rc, it is preferable to set the minimum level Pw(max) of the recording power Pw of the laser beam used in the direct overwriting number determination routine to a lower level that that the minimum level Pw(max) of the recording power Pw of the laser beam used in the critical signal amplitude reduction ratio determination routine.

Then, a jitter degradation level R4(n+1) defined as (JJ(n+1)−JJ0) is calculated for each of the levels of the recording power Pw of the laser beam. Here, n is the number of the direct overwriting of the test signal recorded on the first track and the test signal recorded on the third track and n is equal to or larger than 0 and equal to or smaller than y.

Further, the values of the jitter degradation levels R4(n+1) are plotted with respect to the value n for each of the levels of the recording power Pw of the laser beam. As a result, it can be seen that in the case where the recording power Pw of the laser beam equal to or higher than the recording power Pw sufficiently for enabling the influence of cross erasing of data on the test signal recorded on the second track to be saturated when the test signal recorded on the first track and the test signal recorded on the third track had been directly overwritten n times was selected, the jitter degradation levels R4(n+1) no longer changed when the value of n became equal to or larger than a value no.

Here, it can be seen that the value no at which the jitter degradation levels R4(n+1) becomes constant becomes smaller as the recording power Pw of the laser beam is higher and the value nc becomes larger as the recording power Pw of the laser beam is lower.

Therefore, the value no at which the jitter degradation levels R4(n+1) becomes constant when the recording power Pw of the laser beam determined so that the influence of cross erasing of data on the test signal recorded on the second track can be saturated by directly overwriting the test data recorded on the first track and the test data recorded on the third track is lowest, namely, the maximum value of nc is determined as the number of times x of the direct overwriting to be performed so as to directly overwrite the test signal recorded on the first track and the test signal recorded on the third track.

According to this embodiment, prior to shipping a optical recording medium 10, since a critical signal amplitude reduction ratio Rc is determined and recorded in the optical recording medium 10 by the optical recording medium manufacturer, it is possible to set the recording power Pw of a laser beam to an optimum power with a simple operation in a short time when data are to be recorded in the optical recording medium 10 and it is therefore possible to reduce the burden of the user.

Further, according to this embodiment, based on the first graph showing the relationship between the second signal amplitude reduction ratio R2 defined as $\{A1-A(x+1)\}/A1$ and the jitter degradation level R3 is defined as $\{J(x+1)-J1\}$, a value b of the second signal amplitude reduction ratio R2 corresponding to a value a of the permissible maximum jitter degradation level R3 is obtained and based on the second graph showing the relationship between the first signal amplitude reduction ratio R1 is defined as $(A0-A1)/A0$ and the second signal amplitude reduction ratio R2, a value c of the signal amplitude reduction ratio R1 corresponding to the value b of the second signal amplitude reduction ratio R2 is obtained, thereby determining the value c of the signal amplitude reduction ratio R1 as a critical signal amplitude reduction ratio Rc. Further, the jitter degradation level R3 is defined as the difference between the jitter J(x+1) of the reproduced signal obtained by reproducing the test signal recorded on the second track after directly overwriting the test signal recorded on the first track and the test signal recorded on the third track with the test signal x times and the jitter J1 of the reproduced signal obtained by reproducing the test signal recorded on the second track after recording the test signal on the second track and recording the test signal on the third track, and the number of times x of the direct overwriting is determined so that when the test signal recorded on the first track and the test signal recorded on the third track have been directly overwritten with the test signal x times, the influence of cross erasing of data on the test signal recorded on the second track has been saturated. Therefore, since the thus determined critical signal amplitude reduction ratio Rc corresponds to a critical jitter degradation level R3 at which the increase in the degradation of jitter can be permitted even when the test signal has been repeatedly influenced by cross erasing of data until the influence of cross erasing of data has been saturated, it is possible to determine an optimum power of the recording power Pw of the laser beam so as to control the increase in jitter of a reproduced signal can be controlled within tolerance by judging whether or not the first signal amplitude reduction ratio R1 is equal to or smaller than a critical signal amplitude reduction ratio Rc at Step S9 of the laser beam recording power determination routine shown in FIG. 3.

Furthermore, according to this embodiment, since the number of times nc of the direct overwriting is experimentally determined in the direct overwriting number determination routine so that in the case of directly overwriting the test signal recorded on the first track and the test signal recorded on the third track with test signal by nc times using the laser beam having a low recording power Pw, the influence of cross erasing of data on the test signal recorded on the second track can be saturated, thereby determining the number of times x used in the critical signal amplitude reduction ratio determination routine, it is possible to accurately determine the critical signal amplitude reduction ratio Rc as a value corresponding to the critical jitter degradation level R3 at which the increase in the degradation of jitter can be permitted even when the test signal has been repeatedly influenced by cross erasing of data until the influence of cross erasing of data has been saturated and it is therefore possible to determine an optimum power of the recording power Pw of the laser beam 80 as to control the increase in jitter of a reproduced signal can be controlled within tolerance by judging whether or not the first signal amplitude reduction ratio R1 is equal to or smaller than a critical signal amplitude reduction ratio Rc at Step S9 of the laser beam recording power determination routine shown in FIG. 3.

The present invention has thus been shown and described with reference to a specific embodiment and a working example. However, it should be noted that the present invention is in no way limited to the details of the described arrangements but changes and modifications may is be made without departing from the scope of the appended claims.

For example, in the above described preferred embodiment, although the critical signal amplitude reduction ratio determination routine and the direct overwriting number determination routine are performed by the optical recording medium manufacturer, thereby determining the critical signal amplitude reduction ratio Rc and recording the thus determined critical signal amplitude reduction ratio Rc in the optical recording medium 10, the critical signal amplitude reduction ratio Re recorded in the optical recording medium 10 is read by the data recording apparatus when data are to be recorded in the optical recording medium 10 and the laser beam recording power determination routine is performed, it is sufficient for the critical signal amplitude reduction ratio determination routine and the direct overwriting number determination routine to be performed prior to performing the laser beam recording power determination routine and it is not absolutely necessary for the optical recording medium manufacturer to perform the critical signal amplitude reduction ratio determination routine and the direct overwriting number determination routine. Therefore, the critical signal amplitude reduction ratio determination routine and the direct overwriting number determination routine may be performed by the data recording apparatus prior to performing the laser beam recording power determination routine.

Furthermore, in the above described preferred embodiment, although the critical signal amplitude reduction ratio determination routine and the direct overwriting number determination routine are performed by the optical recording medium manufacturer, thereby determining the critical signal amplitude reduction ratio Rc and recording the thus determined critical signal amplitude reduction ratio Rc in the optical recording medium 10, the critical signal amplitude reduction ratio Rc recorded in the optical recording medium 10 is read by the data recording apparatus when data are to be recorded in the optical recording medium 10 and the laser beam recording power determination routine is performed, it is sufficient for the laser beam recording power determination routine to be performed after performing the critical signal amplitude reduction ratio determination routine and it is not absolutely necessary for the data recording apparatus to perform the laser beam recording power determination routine. Therefore, the laser beam recording power determination routine may be performed by the optical recording medium manufacturer after performing the critical signal amplitude reduction ratio determination routine and the direct overwriting number determination routine. In such a case, it is preferable to constitute so that an optimum power of the recording power Pw of the laser beam is recorded in the optical recording medium 10 prior to shipping the optical recording medium 10 and the optimum power of the recording power Pw of the laser beam recorded in the optical recording medium 10 is read by the data recording apparatus, whereby the power of the laser beam is set to the optimum power and data are recorded in the optical recording medium 10.

Moreover, in the above described preferred embodiment, although the ID data and the critical signal amplitude reduction ratio Rc are recorded in the optical recording medium 10 and when data are to be recorded in the optical recording medium 10, the data recording apparatus reads the ID data recorded in the optical recording medium 10, reads the linear data recording velocity and the pulse train pattern for modulating the power of the laser beam stored in the memory so as to be associated with the ID data of the optical recording medium 10 and reads the critical signal amplitude reduction ratio Re recorded in the optical recording medium 10, thereby performing the laser beam recording power determination routine and determining an optimum power of the recording power Pw of the laser beam, it is possible to calculate the critical signal amplitude reduction ratio Rc in advance and store the critical signal amplitude reduction ratio Rc in the memory of the data recording apparatus so as to be associated with the ID data of the optical recording medium 10, and to constitute the data recording apparatus so as to read the ID data recorded in the optical recording medium 10, read the critical signal amplitude reduction ratio R in addition to the linear data recording velocity and the pulse train pattern for modulating the power of the laser beam and determine an optimum power of the recording power Pw of the laser beam. In such a case, it is unnecessary to record the critical signal amplitude reduction ratio Rc in the optical recording medium 10 and it is possible to effectively utilize the capacity of the optical recording medium 10.

Further, in the above described preferred embodiment, although the ID data and the critical signal amplitude reduction ratio Rc are recorded in the optical recording medium 10 and when data are to be recorded in the optical recording medium 10, the data recording apparatus reads the ID data recorded in the optical recording medium 10, reads the linear data recording velocity and the pulse train pattern for modulating the power of the laser beam stored in the memory so as to be associated with the ID data of the optical recording medium 10 and reads the critical signal amplitude reduction ratio Rc recorded in the optical recording medium 10, thereby performing the laser beam recording power determination routine and determining an optimum power of the recording power Pw of the laser beam, it is possible to calculate the critical signal amplitude reduction ratio Rc in advance, determine an optimum power of the recording power Pw of the laser beam based on the thus calculated critical signal amplitude reduction ratio Rc and store the critical signal amplitude reduction ratio Rc in the memory of the data recording apparatus so as to be associated with the ID data of the optical recording medium 10, and to constitute the data recording apparatus so as to read the ID data recorded in the optical recording medium 10, read the optimum power of the recording power Pw of the laser beam in addition to the linear data recording velocity and the pulse train pattern for modulating the power of the laser beam and determines an optimum power of the recording power Pw of the laser beam. In such a case, since it is unnecessary to record the critical signal amplitude reduction ratio Rc in the optical recording medium 10, it is possible to effectively utilize the capacity of the optical recording medium 10 and the data recording apparatus can immediately record data in the optical recording medium 10 without performing the laser beam recording power determination routine when data are to be recorded in the optical recording medium 10.

Furthermore, in the above described preferred embodiment, although the ID data and the critical signal amplitude reduction ratio Rc are recorded in the optical recording medium 10 and when data are to be recorded in the optical recording medium 10, the data recording apparatus reads the ID data recorded in the optical recording medium 10, reads the linear data recording velocity and the pulse train pattern for modulating the power of the laser beam stored in the memory so as to be associated with the ID data of the optical recording medium 10 and reads the critical signal amplitude reduction ratio Rc recorded in the optical recording medium 10, thereby performing the laser beam recording power determination routine and determining an optimum power of the recording power Pw of the laser beam, it is possible to store the table T shown in FIG. 6 in the optical recording medium 10 instead of the critical signal amplitude reduction ratio Rc and constitute the data recording apparatus so as to read the table T recorded in the optical recording medium 10, perform the critical signal amplitude reduction ratio determination routine, thereby calculating the critical signal amplitude reduction ratio Rc, perform the laser beam recording power determination routine using the thus calculated critical signal amplitude reduction ratio Rc, thereby determining the optimum power of the recording power Pw of the laser beam. In such a case, it is possible to constitute the data recording apparatus so as to store an program for performing the critical signal amplitude reduction ratio determination routine and perform the critical signal amplitude reduction ratio determination routine in accordance with the stored program or it is possible to store an program for performing the critical signal amplitude reduction ratio determination routine in the optical recording medium 10 and constitute the data recording apparatus so as to read the program stored in the optical recording medium 10 and perform the critical signal amplitude reduction ratio determination routine.

Moreover, in the above described preferred embodiment, although the ID data and the critical signal amplitude reduction ratio Rc are recorded in the optical recording medium 10, when data are to be recorded in the optical recording medium 10, the data recording apparatus reads the ID data recorded in the optical recording medium 10, reads the linear data recording velocity and the pulse train pattern for modulating the power of the laser beam stored in the memory so as to be associated with the ID data of the optical recording medium 10 and reads the critical signal amplitude reduction ratio Rc recorded in the optical recording medium 10, thereby performing the laser beam recording power determination routine and determining an optimum power of the recording power Pw of the laser beam, and a program for performing the laser beam recording power determination routine, it is not absolutely necessary for the data recording apparatus to store a program for performing the laser beam recording power determination routine and it is possible to store a program for performing the laser beam recording power determination routine in the optical recording medium 10 and constitute the data recording apparatus so as to read the program for performing the laser beam recording power determination routine and perform the laser beam recording power determination routine.

Furthermore, in the above described preferred embodiment, although the laser beam recording power determination routine is performed by increasing the recording power Pw of the laser beam from the minimum power Pw(min) determined in advance by $\alpha$, it is sufficient to perform the laser beam recording power determination routine by changing the recording power Pw of the laser beam between the maximum power Pw(ma) and the minimum power Pw(min) of the laser beam determined in advance and how to change the recording power Pw of the laser beam is not particularly limited.

Further, in the above described preferred embodiment, although the direct overwriting number determination routine is performed by increasing the recording power Pw of the laser beam from the minimum power Pw(min) determined in advance by $\beta$, it is sufficient to perform the laser beam recording power determination routine by changing the recording power Pw of the laser beam between the maximum power Pw(max and the minimum power Pw(min) of the laser beam determined in advance and how to change the recording power Pw of the laser beam is not particularly limited.

Moreover, in the above described preferred embodiment, although the test signal is recorded using the first signal amplitude reduction ratio R1 defined as $(A0-A1)/A0$ and thereafter, the difference between the amplitude A0 of the reproduced signal obtained by reproducing the test signal recorded on the third track and the amplitude A1 of the reproduced signal obtained by reproducing the test signal recorded on the second track is evaluated, it is possible to record a test signal based on, instead of the first signal amplitude reduction ratio R1, a first signal amplitude reduction parameter defined as a function of the difference between the amplitude A0 of a reproduced signal obtained by reproducing a test signal recorded on a third track after recording the test signal on a first track, a second track and third track in this order and the amplitude A1 of a reproduced signal obtained by reproducing the test signal recorded on the second track, and thereafter evaluate the difference between the amplitude A0 of the reproduced signal obtained by reproducing the test signal recorded on the third track and the amplitude A1 of the reproduced signal obtained by reproducing the test signal recorded on the second track.

Further, in the above described preferred embodiment, although after recording the test signal using the second signal amplitude reduction ratio R2 defined as $(A1-A(x+1))/A1$, the difference between the amplitude A1 of the reproduced signal obtained by reproducing the test signal recorded on the second track and the amplitude $A(x+1)$ of the reproduced signal obtained by reproducing the test signal recorded on the second track after directly overwriting the test signal recorded on the first track and the test signal recorded on the third track x times is evaluated, in stead of the second signal amplitude reduction ratio R2, it is possible to record a test signal on the first track, the second track and the third track in this order, record a test signal based on a second signal amplitude reduction parameter defined as a function of the difference between an amplitude A1 of a reproduced signal obtained by reproducing the test signal recorded on the second track and an amplitude A(x+1) of a reproduced signal obtained by reproducing the test signal recorded on the second track after directly overwriting the test signal recorded on the first track and the test signal recorded on the third track with the test signal x times and evaluate a difference between the amplitude A1 of the reproduced signal obtained by reproducing the test signal recorded on the second track and the amplitude A(x+1) of the reproduced signal obtained by reproducing the test signal recorded on the second track after directly overwriting the test signal recorded on the first track and the test signal recorded on the third track with the test signal x times.

Furthermore, in the above described preferred embodiment, although the jitter degradation level R3 is defined as {J(x+1)−J1}, it is sufficient for the jitter degradation level R3 to be defined as a function of the difference between jitter J(x+1) of a reproduced signal obtained by reproducing a test signal recorded on the second track after directly overwriting the test signal recorded on the first track and the test signal recorded on the third track with the test signal x times and jitter J1 of a reproduced signal obtained by reproducing a test signal recorded on the second track after recording the test signal on the first track, the second track and the third track in this order and it is not absolutely necessary for the jitter degradation level R3 to be defined as {J(x+1)−J1}. The jitter degradation level R3 may be defined as {J(x+1)−J1}/J(+1) or {J(x+1)−J1}.

Moreover, in the above described preferred embodiment, although the jitter degradation level R4(n+1) is defined as {JJ(n+1)−J10}, it is not absolutely necessary for the jitter degradation level R4(n+1) as {JJ(n+1)−J10} and it is sufficient for the jitter degradation level R4(n+1) to be defined as a function of the difference between jitter JJ(D+1) of a reproduced signal obtained by reproducing a test signal recorded on the second track after directly overwriting the test signal recorded on the first track and the test signal recorded on the third track with the test signal n times and jitter JJ0 of a reproduced signal obtained by reproducing a test signal recorded on the second track after recording the test signal on the first track, the second track and the third track in this order.

According to the present invention, it is possible to provide a method for determining the power of a laser beam which can determine the recording power of the laser beam so that jitter of a reproduced signal obtained by reproducing data recorded in a data rewritable type optical recording medium can be controlled within a tolerance even when cross erasing of data occurs and that the reproduced signal having the highest level can be obtained.

Further, according to the present invention, it is possible to provide a method for determining a critical parameter used for determining the power of a laser beam which can determine the recording power of the laser beam to be projected onto a data rewritable type optical recording medium so that jitter of a reproduced signal obtained by reproducing data recorded in the data rewritable type optical recording medium can be controlled within a tolerance even when cross erasing of data occurs and that the reproduced signal having the highest level can be obtained.

Furthermore, according to the present invention, it is possible to provide a data rewritable type optical recording medium in which a critical parameter used for determining the power of a laser beam which can determine the recording power of the laser beam so that jitter of a reproduced signal obtained by reproducing data recorded therein can be controlled within a tolerance even when cross erasing of data occurs and that the reproduced signal having the highest level can be obtained.

Moreover, according to the present invention, it is possible to provide a data recording apparatus storing a critical parameter used for determining the power of a laser beam which can determine the recording power of the laser beam to be projected onto a data rewritable type optical recording medium so that jitter of a reproduced signal obtained by reproducing data recorded in the data rewritable type optical recording medium can be controlled within a tolerance even when cross erasing of data occurs and that the reproduced signal having the highest level can be obtained.

Further, according to the present invention, it is possible to provide a data recording apparatus storing an optimum recording power of a laser beam to be projected onto a data rewritable optical recording medium so that jitter of a reproduced signal obtained by reproducing data recorded in the data rewritable type optical recording medium can be controlled within a tolerance even when cross erasing of data occurs and that the reproduced signal having the highest level can be obtained.

The invention claimed is:

1. A method for determining a power of a laser beam which is adapted for determining a recording power of the laser beam to be projected onto a data rewritable type optical recording medium for recording data therein, which comprises steps of:

projecting the laser beam onto a first track, a second track and a third track in this order formed on the data rewritable type optical recording medium to be adjacent with each other while varying a level of the recording power of the laser beam, thereby recording a first test signal;

reproducing the first test signal recorded on the second track, measuring, for each of the levels of the recording power of the laser beam, jitter JJ1 of the thus reproduced signal, reproducing the first test signal recorded on the third track, measuring jitter JJ0 of the thus reproduced signal;

projecting the laser beam onto the first track and the third track y times where y is a positive integer, thereby directly overwriting the first test signal recorded on the first track and the first test signal recorded on the third track with the first test signal;

reproducing the first test signal recorded on the second track, measuring jitter JJ(n+1) of the thus reproduced signal where n is an integer equal to or larger than 0 and equal to or smaller than y, obtaining, for each of the levels of the recording power of the laser beam, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal;

setting the recording power of the laser beam to a predetermined level, projecting the laser beam onto a fourth track, a fifth track and a sixth track in this order formed on the data rewritable type optical recording medium to be adjacent with each other, thereby recording a second test signal thereon, reproducing the second test signal recorded on the fifth track, measuring an amplitude A1 and jitter J1 of the thus reproduced signal, reproducing the second test signal recorded on the sixth track, measuring an amplitude A0 of the thus reproduced signal, calculating, for each of the levels of the recording power of the laser beam, a first parameter as a function of a difference between the amplitude A0 of the reproduced signal obtained from the sixth track and the amplitude A1 of the reproduced signal obtained from the fifth track;

directly overwriting the second test signal recorded on the fourth track and the second test signal recorded on the sixth track with the second test signal x times, reproducing the second test signal recorded on the fifth track, measuring an amplitude A(x+1) and jitter J(x+1) of the thus reproduced signal, calculating, for each of the levels of the recording power of the laser beam, a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal;

obtaining a value of the first parameter corresponding to a value of the second parameter when the third parameter is equal to a tolerance, thereby determining a critical parameter;

recording a third test signal in the data rewritable type optical recording medium while varying levels of the recording power of the laser beam;

measuring, when signal characteristics of a reproduced signal obtained by reproducing the third signal recorded in the data rewritable type optical recording medium satisfy reference conditions, an amplitude D3 of a reproduced signal obtained by reproducing the third test signal before the third test signal is influenced by cross erasing of data and an amplitude D2 of a reproduced signal obtained by reproducing the third test signal after the third test signal was once influenced by cross erasing of data for each of the levels of the recording power of the laser beam, calculating, based on the amplitude D2 of the reproduced signal and the amplitude D3 of the reproduced signal obtained by reproducing the third test signals, a fourth parameter as a function of a difference between the amplitude D3 of the reproduced signal obtained by reproducing the third test signal before the third test signal is influenced by cross erasing of data and the amplitude D2 of the reproduced signal obtained by reproducing the third test signal after the third test signal was once influenced by cross erasing of data; and comparing the critical parameter and the fourth parameter, and determining the recording power of the laser beam at which the fourth parameter was obtained as an optical recording power when the fourth parameter is equal to or smaller than the critical parameter.

2. A method for determining a power of a laser beam in accordance with claim 1, which comprises steps of:

setting the recording power of the laser beam to a predetermined level, sequentially projecting the laser beam onto a seventh track, an eighth track, and a ninth track formed on the data rewritable type optical recording medium to be adjacent with each other in this order, thereby recording a third test signal thereon;

reproducing the third test signal recorded on the eighth track, judging whether or not signal characteristics of the thus obtained reproduced signal satisfy reference conditions, changing, when the signal characteristics of the reproduced signal do not satisfy the reference conditions, the level of the recording power of the laser beam and recording the third test signal onto the eighth track and the ninth track in this order formed on the data rewritable type optical recording medium to be adjacent with each other until signal characteristics of a reproduced signal obtained by reproducing the third test signal recorded on the eighth track satisfy the reference conditions;

reproducing the third test signal recorded on the eighth track and measuring an amplitude of the thus obtained reproduced signal, thereby obtaining the amplitude D2;

reproducing the third test signal recorded on the ninth track and measuring an amplitude of the thus obtained reproduced signal, thereby obtaining the amplitude D3, and determining the fourth parameter as a function of a difference between the amplitude D3 of the reproduced signal obtained from the ninth track and the amplitude D2 of the reproduced signal obtained from the eighth track.

3. A method for determining a critical parameter used for determining a recording power of a laser beam to be projected onto a data rewritable type optical recording medium for recording data therein, which comprises steps of:

setting the recording power of the laser beam to a predetermined level, sequentially projecting the laser beam onto a first track, a second track and a third track formed on the data rewritable type optical recording medium to be adjacent with each other in this order, thereby recording a first test signal thereon, reproducing the first test signal recorded on the second track, measuring an amplitude A1 and jitter J1 of the thus obtained reproduced signal, reproducing the first test signal recorded on the third track, measuring an amplitude A1 of the thus obtained reproduced signal;

calculating a first parameter as a function of a difference between the amplitude A0 of the reproduced signal obtained from the third track and the amplitude A1 of the reproduced signal obtained from the second track, directly overwriting the first test signal recorded on the first track and the first test signal recorded on the third track with the first test signal predetermined times equal to a predetermined number of times x until an influence of cross erasing of data on the first test signal recorded on the second track has become saturated;

reproducing the first test signal recorded on the second track, measuring an amplitude A(x+1) and jitter J(x+1) of the thus obtained reproduced signal;

calculating a second parameter as a function of a difference between the amplitude A1 of the reproduced signal and the amplitude A(x+1) of the reproduced signal;

calculating a third parameter as a function of a difference between the jitter J(x+1) of the reproduced signal and the jitter J1 of the reproduced signal;

repeatedly performing the above identified steps while varying levels of the recording power of the laser beam by α within a predetermined range;

calculating the first parameter, the second parameter and the third parameter for each of the levels of the recording power of the laser beam; and obtaining a value of the first parameter corresponding to a value of the second parameter when the third parameter is equal to a tolerance, and determining the thus obtained value of the first parameter as a critical parameter.

4. A data rewritable type optical recording medium recorded with a critical parameter used for determining a recording power of a laser beam, the critical parameter being determined by:

setting the recording power of the laser beam to a predetermined level, projecting the laser beam onto a first track, a second track and a third track in this order formed on the data rewritable type optical recording medium to be adjacent with each other, thereby recording a first test signal, reproducing the first test signal recorded on the second track, measuring jitter JJ1 of the thus reproduced signal, reproducing the first test signal recorded on the third track, measuring jitter JJ0 of the thus reproduced signal, projecting the laser beam onto the first track and the third track y times where y is a positive integer, thereby directly overwriting the first test signal recorded on the first track and the first test signal recorded on the third track with the first test signal, reproducing the first test signal recorded on the second track, measuring jitter JJ(n+1) of the thus reproduced signal where n is an integer equal to or larger than 0 and equal to or smaller than y, obtaining, for each of the levels of the recording power of the laser beam, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal; and setting the recording power of the laser beam to a predetermined level, projecting the laser beam onto a fourth track, a fifth track and a sixth track in this order formed on the data rewritable type optical recording medium to be adjacent with each other, thereby recording a second test signal thereon, reproducing the second test signal recorded on the fifth track, measuring an amplitude A1 and jitter J1 of the thus reproduced signal, reproducing the second test signal recorded on the sixth track, measuring an amplitude A0 of the thus reproduced signal, calculating, for each of the levels of the recording power of the laser beam, a first parameter as a function of a difference between the amplitude A0 of the reproduced signal obtained from the sixth track and the amplitude A1 of the reproduced signal obtained from the fifth track, directly overwriting the second test signal recorded on the fourth track and the second test signal recorded on the sixth track with the second test signal x times, reproducing the second test signal recorded on the fifth track, measuring an amplitude A(x+1) and jitter J(x+1) of the thus reproduced signal, calculating, for each of the levels of the recording power of the laser beam, a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal, and obtaining a value of the first parameter corresponding to a value of the second parameter when the third parameter is equal to a tolerance.

5. A data recording apparatus storing a critical parameter used for determining a recording power of a laser beam so as to be associated with ID data for identifying a kind of an optical recording medium, the critical parameter being determined by:

setting the recording power of the laser beam to a predetermined level, sequentially projecting the laser beam onto a first track, a second track and a third track in this order formed on the data rewritable type optical recording medium to be adjacent with each other, thereby recording a first test signal thereon, reproducing the first test signal recorded on the second track, measuring jitter JJ1 of the thus reproduced signal, reproducing the first test signal recorded on the third track, measuring jitter JJ0 of the thus reproduced signal, projecting the laser beam onto the first track and the third track y times where y is a positive integer, thereby directly overwriting the first test signal recorded on the first track and the first test signal recorded on the third track with the first test signal, reproducing the first test signal recorded on the second track, measuring jitter JJ(n+1) of the thus reproduced signal where n is an integer equal to or larger than 0 and equal to or smaller than y, obtaining, for each of the levels of the recording power of the laser bean, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal;

setting the recording power of the laser beam to a predetermined level, projecting the laser beam onto a fourth track, a fifth track and a sixth track in this order formed on the data rewritable type optical recording medium to be adjacent with each other, thereby recording a second test signal thereon, reproducing the second test signal recorded on the fifth track, measuring an amplitude A1 and jitter J1 of the thus reproduced signal, reproducing the second test signal recorded on the sixth track, measuring an amplitude A0 of the thus reproduced signal, calculating, for each of the levels of the recording power of the laser beam, a first parameter as a function of a difference between the amplitude A0 of the reproduced signal obtained from the sixth track and the amplitude A1 of the reproduced signal obtained from the fifth track, directly overwriting the second test signal recorded on the fourth track and the second test signal recorded on the sixth track with the second test signal x times, reproducing the second test signal recorded on the fifth track, measuring an amplitude A(x+1) and jitter J(x+1) of the thus reproduced signal, calculating, for each of the levels of the recording power of the laser beam, a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal, and obtaining a value of the first parameter corresponding to a value of the second parameter when the third parameter is equal to a tolerance.

6. A data recording apparatus storing an optimum recording power of a laser beam so as to be associated with ID data for identifying a kind of an optical recording medium, the optimum recording power of the laser beam being determined by:

setting the recording power of the laser beam to a predetermined level, projecting the laser beam onto a first track, a second track and a third track in this order formed on the data rewritable type optical recording medium to be adjacent with each other, thereby recording a first test signal, reproducing the first test signal recorded on the second track, measuring jitter JJ1 of the thus reproduced signal, reproducing the first test signal recorded on the third track, measuring jitter JJ0 of the thus reproduced signal, projecting the laser beam onto the first track and the third track y times where y is a positive integer, thereby directly overwriting the first test signal recorded on the first track and the first test signal recorded on the third track with the first test signal, reproducing the first test signal recorded on the second track, measuring jitter JJ(n+1) of the thus reproduced signal where n is an integer equal to or larger than 0 and equal to or smaller than y, obtaining, for each of the levels of the recording power of the laser beam, a value of nc of n at which a function of a difference between JJ(n+1) and JJ0 becomes constant, determining the maximum value of nc as the number of times x of the direct overwriting required for saturating an influence of cross erasing of data on the first test signal recorded on the second track by directly overwriting the first test signal recorded on the first track and the first test signal recorded on the third track with the first test signal;

setting the recording power of the laser beam to a predetermined level, projecting the laser beam onto a fourth track, a fifth track and a sixth track in this order formed on the data rewritable type optical recording medium to be adjacent with each other, thereby recording a second test signal thereon, reproducing the second test signal recorded on the fifth track, measuring an amplitude A1 and jitter J1 of the thus reproduced signal, reproducing the second test signal recorded on the sixth track, measuring an amplitude A0 of the thus reproduced signal, calculating, for each of the levels of the recording power of the laser beam, a first parameter as a function of a difference between the amplitude A0 of the reproduced signal obtained from the sixth track and the amplitude A1 of the reproduced signal obtained from the fifth track, directly overwriting the second test signal recorded on the fourth track and the second test signal recorded on the sixth track with the second test signal x times, reproducing the second test signal recorded on the fifth track, measuring an amplitude A(x+1) and jitter J(x+1) of the thus reproduced signal, calculating, for each of the levels of the recording power of the laser beam, a second parameter as a function of a difference between the amplitude A1 of the reproduced signal and the amplitude A(x+1) of the reproduced signal, calculating a third parameter as a function of a difference between the jitter J(x+1) of the reproduced signal and the jitter J1 of the reproduced signal, obtaining a value of the first parameter corresponding to a value of the second parameter when the third parameter is equal to a tolerance, thereby determining a critical parameter used for determining the recording power of the laser beam; and setting the recording power of the laser beam to a predetermined level, projecting the laser beam onto a seventh track, an eighth track, and a ninth track in this order formed on data rewritable type optical recording medium to be adjacent with each other, thereby recording a third signal, reproducing the third test signal recorded on the eighth track, judging whether or not signal characteristics of the thus reproduced signal satisfy reference conditions, changing, when the signal characteristics of the reproduced signal do not satisfy the reference conditions, the level of the recording power of the laser beam and recording the third test signal onto the eighth track and the ninth track in this order formed on the data rewritable type optical recording medium to be adjacent with each other until signal characteristics of a reproduced signal obtained by reproducing the third test signal recorded on the eighth track satisfy the reference conditions, reproducing the third test signal recorded on the eighth track and measuring an amplitude of the thus obtained reproduced signal, thereby obtaining the amplitude D2, reproducing the third test signal recorded on the ninth track and measuring an amplitude D3 of the thus obtained reproduced signal, determining the fourth parameter as a function of a difference between the amplitude D3 of the reproduced signal obtained from the ninth track and the amplitude D2 of the reproduced signal obtained from the eighth track, comparing the critical parameter and the fourth parameter, and obtaining the recording power of the laser beam at which the fourth parameter was obtained when the fourth parameter is equal to or smaller than the critical parameter.

* * * * *